(12) United States Patent
Yoshimoto

(10) Patent No.: US 11,886,762 B2
(45) Date of Patent: Jan. 30, 2024

(54) PRINTING CONTROL SYSTEM

(71) Applicant: SHARP KABUSHIKI KAISHA, Sakai (JP)

(72) Inventor: Kazuhiro Yoshimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/670,303

(22) Filed: Feb. 11, 2022

(65) Prior Publication Data
US 2022/0308805 A1 Sep. 29, 2022

(30) Foreign Application Priority Data
Mar. 29, 2021 (JP) ................................. 2021-055810

(51) Int. Cl.
*G06F 3/12* (2006.01)
(52) U.S. Cl.
CPC .............. *G06F 3/126* (2013.01); *G06F 3/122* (2013.01); *G06F 3/1205* (2013.01); *G06F 3/1207* (2013.01); *G06F 3/1212* (2013.01); *G06F 3/1267* (2013.01); *G06F 3/1291* (2013.01)

(58) Field of Classification Search
CPC ...... G06F 3/126; G06F 3/1205; G06F 3/1207; G06F 3/1212; G06F 3/122; G06F 3/1267; G06F 3/1291; G06F 3/129; G06F 3/1293; G06F 3/1296; H04N 1/00344; H04N 1/00244; H04N 1/00347
See application file for complete search history.

(56) References Cited

U.S. PATENT DOCUMENTS

| 2018/0004459 A1* | 1/2018 | Yamada ................ G06F 3/1291 |
| 2018/0032298 A1 | 2/2018 | Murata |
| 2020/0034095 A1* | 1/2020 | Mukai ................ H04N 1/00408 |
| 2020/0394003 A1* | 12/2020 | Ohashi ................. G06F 3/1238 |

FOREIGN PATENT DOCUMENTS

| JP | 2017-129940 A | 7/2017 |
| JP | 2018-018318 A | 2/2018 |

* cited by examiner

*Primary Examiner* — John R Wallace
(74) *Attorney, Agent, or Firm* — ScienBiziP, P.C.

(57) ABSTRACT

A printing control system comprising: a plurality of image forming apparatuses set as parent units; and a plurality of image forming apparatuses set as child units, all of which are connected together through a network, wherein a child of the child units unit obtains a job list response from any one of the parent units either storing a print data item to be identified with a job name of a print data item included in a job list information item requested by a job list request, or not storing the print data item.

19 Claims, 27 Drawing Sheets

FIG.4A

| SELF-SETTING INFORMATION ITEM | | 31 | (PARENT UNIT P01) |
|---|---|---|---|
| 1 | IDENTIFICATION INFORMATION ITEM (APPARATUS NAME) | | P01 |
| 2 | APPARATUS TYPE | | PARENT UNIT |
| 3 | IP ADDRESS | | 192.168.10.1 |
| 4 | GROUP NAME | | G1 |

FIG.4B

| SELF-SETTING INFORMATION ITEM | | 71 | (CHILD UNIT C001) |
|---|---|---|---|
| 1 | IDENTIFICATION INFORMATION ITEM (APPARATUS NAME) | | C001 |
| 2 | APPARATUS TYPE | | CHILD UNIT |
| 3 | IP ADDRESS | | 192.168.10.51 |
| 4 | GROUP NAME | | G1 |

FIG.5A

OTHER PARENT UNIT INFORMATION ITEM  32

(PARENT UNIT: P01)

| | PARENT UNIT IDENTIFICATION INFORMATION ITEM | IP ADDRESS |
|---|---|---|
| 1 | P02 | 192.168.10.2 |
| 2 | P03 | 192.168.10.3 |

(PARENT UNIT: P02)

| | PARENT UNIT IDENTIFICATION INFORMATION ITEM | IP ADDRESS |
|---|---|---|
| 1 | P01 | 192.168.10.1 |
| 2 | P03 | 192.168.10.3 |

FIG.5B

PARENT UNIT CONNECTION INFORMATION ITEM  72

CHILD UNIT C001, C002

| PARENT UNIT IDENTIFICATION INFORMATION ITEM | IP ADDRESS |
|---|---|
| P01 | 192.168.10.1 |

CHILD UNIT C003, C004

| PARENT UNIT IDENTIFICATION INFORMATION ITEM | IP ADDRESS |
|---|---|
| P02 | 192.168.10.2 |

CHILD UNIT C005, C006

| PARENT UNIT IDENTIFICATION INFORMATION ITEM | IP ADDRESS |
|---|---|
| P03 | 192.168.10.3 |

FIG.6

| PRINT INFORMATION ITEM | | 33 |
|---|---|---|

| 1 | USER NAME | US1111 |
|---|---|---|
| 2 | JOB NAME | F101 |
| 3 | DATE | 2020.09.11 |
| 4 | PRINT SETTING | COLOR<br>PAPER SIZE: A4<br>NUMBER OF COPIES: 1 |

(PRINT DATA ITEM)

| 1 | USER NAME | US2222 |
|---|---|---|
| 2 | JOB NAME | F202 |
| 3 | DATE | 2020.09.12 |
| 4 | PRINT SETTING | BLACK AND WHITE<br>PAPER SIZE: A4<br>NUMBER OF COPIES: 3 |

(PRINT DATA ITEM)

FIG.7

JOB LIST REQUEST 73 (RECEPTION JOB LIST REQUEST 35)

| 1 | REQUEST APPARATUS NAME | C006 |
|---|---|---|
| 2 | DESTINATION PARENT UNIT NAME | P01 |
| 3 | USER NAME | US1111 |
| 4 | REQUEST DETAIL | JOB LIST OF USER |

| 1 | REQUEST APPARATUS NAME | C006 |
|---|---|---|
| 2 | DESTINATION PARENT UNIT NAME | P02 |
| 3 | USER NAME | US1111 |
| 4 | REQUEST DETAIL | JOB LIST OF USER |

FIG.8A

| JOB LIST INFORMATION ITEM | 34 | (75) |

| | | |
|---|---|---|
| 1 | USER NAME | US1111 |
| 2 | SAVING PARENT UNIT NAME | P03 |
| 3 | SAVED JOB NAME | F101,F102,F103 |

FIG.8B

| JOB LIST RESPONSE | 36 | (RECEPTION JOB LIST RESPONSE 74) |

| | | |
|---|---|---|
| 1 | PARENT UNIT NAME | P02 |
| 2 | DESTINATION CHILD UNIT NAME | C006 |
| 3 | USER NAME | US1111 |
| 4 | SAVING PARENT UNIT NAME | P03 |
| 5 | SAVED JOB NAME | F101,F102,F103 |

FIG.9

| | PRINT INFORMATION REQUEST | 76 | (RECEPTION PRINT INFORMATION REQUEST 37) |

| 1 | CHILD UNIT NAME | C006 |
|---|---|---|
| 2 | DESTINATION PARENT UNIT NAME | P02 |
| 3 | USER NAME | US1111 |
| 4 | REQUEST JOB NAME | F101,F103 |
| 5 | REQUEST DETAIL | PRINT FILE |

| 1 | CHILD UNIT NAME | C004 |
|---|---|---|
| 2 | DESTINATION PARENT UNIT NAME | P01 |
| 3 | USER NAME | US2222 |
| 4 | REQUEST JOB NAME | F201 |
| 5 | REQUEST DETAIL | PRINT FILE |

FIG.10

| | PRINT RESPONSE INFORMATION ITEM 38 | (RECEPTION PRINT RESPONSE INFORMATION ITEM 77) |
|---|---|---|
| 1 | PARENT UNIT NAME | P02 |
| 2 | DESTINATION CHILD UNIT NAME | C006 |
| 3 | USER NAME | US1111 |
| 4 | PRINT JOB NAME | F101, F103 |
| 5 | DATE | 2020.09.11 |
| 6 | PRINT SETTING | COLOR PAPER SIZE: A4 NUMBER OF COPIES: 1 |

Rows 3–6: PRINT INFORMATION ITEM (33, 78)

(INCLUDING PRINT DATA ITEM)

FIG.11

PARENT UNIT CONNECTION INFORMATION ITEM 72

CHILD UNIT C001、C002

| PARENT UNIT IDENTIFICATION INFORMATION ITEM | IP ADDRESS |
|---|---|
| P01 | 192.168.10.1 |
| P02 | 192.168.10.2 |

CHILD UNIT C003、C004

| PARENT UNIT IDENTIFICATION INFORMATION ITEM | IP ADDRESS |
|---|---|
| P02 | 192.168.10.2 |
| P03 | 192.168.10.3 |

CHILD UNIT C005、C006

| PARENT UNIT IDENTIFICATION INFORMATION ITEM | IP ADDRESS |
|---|---|
| P03 | 192.168.10.3 |
| P01 | 192.168.10.1 |

FIG.12A

EXAMPLE OF CORRESPONDING RELATIONSHIP BETWEEN
PARENT UNIT AND CHILD UNIT FOR EACH GROUP

| INSTALL-ATION FLOOR | GROUP | PARENT UNIT | CHILD UNIT |
|---|---|---|---|
| THIRD FLOOR | G3 | P31 | C031, C032 |
| | | P32 | C033, C034 |
| | | P33 | C035, C036 |
| SECOND FLOOR | G2 | P21 | C021, C022 |
| | | P22 | C023, C024 |
| | | P23 | C025, C026 |
| FIRST FLOOR | G1 | P11 | C011, C012 |
| | | P12 | C013, C014 |
| | | P13 | C015, C016 |

FIG.12B

PARENT UNIT CONNECTION INFORMATION ITEM FOR CHILD UNIT C013 — 72

| | PARENT UNIT IDENTIFICATION INFORMATION ITEM | IP ADDRESS | |
|---|---|---|---|
| 1 | P12 | 192.168.10.12 | (FIRST FLOOR) |
| 2 | P23 | 192.168.10.23 | (SECOND FLOOR) |
| 3 | P33 | 192.168.10.33 | (THIRD FLOOR) |

PARENT UNIT CONNECTION INFORMATION ITEM FOR CHILD UNIT C022 — 72

| | PARENT UNIT IDENTIFICATION INFORMATION ITEM | IP ADDRESS | |
|---|---|---|---|
| 1 | P12 | 192.168.10.12 | (FIRST FLOOR) |
| 2 | P21 | 192.168.10.21 | (SECOND FLOOR) |
| 3 | P32 | 192.168.10.32 | (THIRD FLOOR) |

PARENT UNIT CONNECTION INFORMATION ITEM FOR CHILD UNIT C036 — 72

| | PARENT UNIT IDENTIFICATION INFORMATION ITEM | IP ADDRESS | |
|---|---|---|---|
| 1 | P11 | 192.168.10.11 | (FIRST FLOOR) |
| 2 | P22 | 192.168.10.22 | (SECOND FLOOR) |
| 3 | P33 | 192.168.10.33 | (THIRD FLOOR) |

FIG.12C

OTHER PARENT UNIT INFORMATION ITEM 32

(PARENT UNIT: P11)

| | PARENT UNIT IDENTIFICATION INFORMATION ITEM | IP ADDRESS | GROUP (FLOOR) |
|---|---|---|---|
| 1 | P12 | 192.168.10.12 | G1 (FIRST FLOOR) |
| 2 | P13 | 192.168.10.13 | G1 (FIRST FLOOR) |

(PARENT UNIT: P22)

| | PARENT UNIT IDENTIFICATION INFORMATION ITEM | IP ADDRESS | GROUP (FLOOR) |
|---|---|---|---|
| 1 | P21 | 192.168.10.21 | G2 (SECOND FLOOR) |
| 2 | P23 | 192.168.10.23 | G2 (SECOND FLOOR) |

(PARENT UNIT: P33)

| | PARENT UNIT IDENTIFICATION INFORMATION ITEM | IP ADDRESS | GROUP (FLOOR) |
|---|---|---|---|
| 1 | P31 | 192.168.10.31 | G3 (THIRD FLOOR) |
| 2 | P32 | 192.168.10.32 | G3 (THIRD FLOOR) |

FIG.13A

OTHER PARENT UNIT INFORMATION ITEM  32

(PARENT UNIT: P12)

| | PARENT UNIT IDENTIFICATION INFORMATION ITEM | IP ADDRESS | GROUP (FLOOR) |
|---|---|---|---|
| 1 | P11 | 192.168.10.11 | G1 (FIRST FLOOR) |
| 2 | P13 | 192.168.10.13 | G1 (FIRST FLOOR) |
| 3 | P21 | 192.168.10.21 | G2 (SECOND FLOOR) |
| 4 | P31 | 192.168.10.31 | G3 (THIRD FLOOR) |

(PARENT UNIT: P21)

| | PARENT UNIT IDENTIFICATION INFORMATION ITEM | IP ADDRESS | GROUP (FLOOR) |
|---|---|---|---|
| 1 | P22 | 192.168.10.22 | G2 (SECOND FLOOR) |
| 2 | P23 | 192.168.10.23 | G2 (SECOND FLOOR) |
| 3 | P12 | 192.168.10.12 | G1 (FIRST FLOOR) |
| 4 | P32 | 192.168.10.32 | G3 (THIRD FLOOR) |

(PARENT UNIT: P31)

| | PARENT UNIT IDENTIFICATION INFORMATION ITEM | IP ADDRESS | GROUP (FLOOR) |
|---|---|---|---|
| 1 | P32 | 192.168.10.32 | G3 (THIRD FLOOR) |
| 2 | P33 | 192.168.10.33 | G3 (THIRD FLOOR) |
| 3 | P13 | 192.168.10.13 | G1 (FIRST FLOOR) |
| 4 | P23 | 192.168.10.23 | G2 (SECOND FLOOR) |

| | PARENT UNIT IDENTIFICATION INFORMATION ITEM | IP ADDRESS | |
|---|---|---|---|
| 1 | P32 | 192.168.10.32 | (THIRD FLOOR) |

PARENT UNIT CONNECTION INFORMATION ITEM FOR CHILD UNIT C033  72

FIG.14

JOB LIST DISPLAY SCREEN

SELECT A FILE FROM THE
JOB LIST BELOW TO PRINT OUT,
AND PRESS PRINT START.

| USER NAME | US1111 |
| --- | --- |
| SAVING PARENT UNIT NAME | P02 |

| JOB LIST | FILE NAME | DATE | SELECTION BOX |
| --- | --- | --- | --- |
| 1 | DAILY REPORT F101 | 2020.07.21 | ✓ |
| 2 | PROPOSAL F102 | 2020.07.21 | |
| 3 | REPORT F103 | 2020.07.21 | ✓ |

SELECT ALL   CLEAR SELECTION

PRINT START

PRINTING CONTROL SYSTEM

CROSS-REFERENCE TO RELATED APPLICATION

The present application claims priority from Japanese Application JP2021-055810, the content to which is hereby incorporated by reference into this application.

BACKGROUND OF THE INVENTION

1. Field of the Invention

The present invention relates to printing control systems, and, in particular, to a printing control system including a plurality of image forming apparatuses connected together through a network. The printing control system allows an image forming apparatus to store print data created by a user, and another image forming apparatus to print out the print data.

2. Description of the Related Art

Conventional printing systems known in the art include a plurality of image forming apparatuses connected together through a network. In such a printing system, a specific one of the image forming apparatuses (a parent unit) stores print data DATA transmitted from a mobile terminal of a user. When the user operates an image forming apparatus (a child unit), different from the specific image forming apparatus, to print out the print data DATA, the child unit can ask the parent unit to transmit the print data DATA to the child unit, and print out the print data DATA.

For example, Japanese Unexamined Patent Application Publication No. 2018-018318 discloses a printing system. In the printing system, a user terminal transmits a print job to one of image forming apparatuses set as a parent unit, and the parent unit stores the print job. Another one of the image forming apparatuses set as a child unit previously stores the IP address of the parent unit. When the user moves to a position where the child unit is placed and enters user information through the child unit to log in to the parent unit, the child unit obtains the print job from the parent unit. On a print instruction from the user, the child unit prints out the print data included in the print job.

Moreover, the Japanese Unexamined Patent Application Publication No. 2017-129940 discloses an information processing system. In the information processing system, when a user inputs a user ID and a password into, and logs in, a child unit, the input user ID and password are transmitted to a parent unit storing print jobs for each of the users, and the parent unit performs authentication of the user. If the user is successfully authenticated by the parent unit, the parent unit transmits to the child unit information on the print jobs corresponding to the user ID, and the child unit displays a list of the print jobs for the user. On the child unit, the user selects a print job and instructs the child unit to start printing, and the child unit transmits to the parent unit a transmission request of the selected print job. The parent unit transmits to the child unit the print job on the transmission request. Then, the child unit print out the received print job.

SUMMARY OF THE INVENTION

In the above conventional printing system, the one specific image forming apparatus is designated as the parent unit to store the print data. Hence, if each of the child units previously stores information regarding the parent unit, one of the child units to print out the print data establishes a connection to the parent unit so that the print data can be easily obtained.

However, if the printing system includes a plurality of parent units and child units, a child unit to execute a print job might not be able to identify which parent unit stores the print data.

For example, if the child unit can establish a connection to five parent units, the child unit has to send an inquiry to each of the five parent units whether the parent unit stores the print data, and has to wait for a reply (a response to the inquiry) from each of the parent units to find out the parent unit storing the print data.

The more parent units the printing system has, the more time it takes to find out the parent unit storing the print data.

Moreover, if there are many parent units connectable from the child unit, the child unit transmits information for inquiries more frequently and the parent units transmit more responses to the inquiries. Hence, the child unit is under heavy load of processing including transmitting inquiries and receiving the responses.

In contrast, if there are many child units connectable to one parent unit, the parent unit has to execute processing including receiving information for many inquiries, obtaining print jobs corresponding to the respective inquiries, and transmitting a response to the inquiry from each of the child units. Hence, the parent unit is also under heavy load of processing including receiving the inquiries, obtaining the print jobs, and transmitting the responses.

Moreover, when a child unit for printing transmits the above inquiry to each of the parent units, and after that, a timer is set to wait for a reply from the parent units, if one of the parent units is suspended because of, for example, maintenance, the one parent unit will not send the reply. Hence, the user has to wait until the time period set for the timer elapses. Such a problem causes inconvenience to the user.

In view of the above circumstances, an aspect of the present invention provides a printing control system including a plurality of image forming apparatuses connected to a network, and the image forming apparatuses include a plurality of parent units capable of storing print data created by a user. Even though the image forming apparatuses include many parent units and child units capable of connecting together through the network, the printing control system can reduce the load on both of the parent units and the child units. In the printing control system, the user can print out the print data easily and quickly, using an image forming apparatus not storing the print data. Thus, the printing control system can be highly convenient for the user.

An aspect of the present invention provides a printing control system. The printing control system includes: a plurality of image forming apparatuses set as parent units; and a plurality of image forming apparatuses set as child units, all of which are connected together through a network. Each of the parent units includes: a job list obtainer that obtains a job list information item from an other parent unit included in the parent units, and stores the job list information item, the job list information item including a job name of a print data item stored on the other parent unit; and a print job responder that receives a job list request from any given first child unit included in the child units, and transmits a job list response to the any given first child unit, the job list request requesting for transmission of the job list information item, and the job list response including the requested job list information item. Each of the child units includes: a job list request provider that transmits the job list request to a connectable parent unit included in the parent units and stored in a parent unit connection information item that identifies the connectable parent unit; and a job list response obtainer that obtains the job list response to be sent back from the parent unit. The any given first child unit obtains the job list response from any one of the parent units either storing the print data item to be identified with the job name of the print data item included in the job list information item requested by the job list request, or not storing the print data item.

An aspect of the present invention provides a printing control system. The printing control system includes: a plurality of image forming apparatuses set as parent units; and a plurality of image forming apparatuses set as child units, all of which are connected together through a network. Each of the parent units includes: a first memory that stores one or more print data items; a print job notifier that transmits a job list information item to an other parent unit included in the parent units, the job list information item including a job name of the one or more print data items stored on the first memory; a job list obtainer that obtains the job list information item transmitted from the other parent unit, and stores the job list information item on the first memory; a job list request obtainer that obtains a job list request (i) transmitted from any given first child unit included in the child units and (ii) requesting for transmission of the job list information item to the any given first child unit, the job list information item including the job name of the one or more print data items; and a print job responder that transmits a job list response to the any given first child unit as a response to the obtained job list request, the job list response including the job list information item requested from the any given first child unit. Each of the child unit includes: a second memory that stores a parent unit connection information item that identifies a connectable parent unit included in the parent units; a job list request provider that transmits the job list request to the connectable parent unit stored in the parent unit connection information item; and a job list response obtainer that obtains the job list response to be sent back from the parent unit to which the job list request has been transmitted. The any given first child unit obtains the job list response from any one of the parent units either storing the one or more print data items to be identified with the job name of the one or more print data items included in the job list information item requested by the job list request, or not storing the one or more print data items.

The first memory of the parent unit previously stores an other parent unit information item including information on the other parent unit including one or more connectable other parent units of the parent units. The print job notifier transmits the job list information item to the one or more connectable other parent units stored in the other parent unit information item.

The parent unit connection information item, stored on the second memory of each of the child units, stores information for one of the parent units.

Among the parent units and the child units included in the printing control system, one or more connectable parent units and one or more connectable child units are previously set as image forming apparatuses that belong to one group. The parent unit connection information item stored on the second memory of each child unit stores information for one or more of the parent units that belong to a same group that the child unit belongs to. The job list request provider of the child unit transmits the job list request to any given one of the parent units stored in the parent unit connection information items.

The child unit further includes a job list display unit that causes the job list information item, included in the job list response obtained by the job list response obtainer, to be displayed.

In requesting the parent unit to transmit, to the any given first child unit, the job list information item including the job name of the one or more print data items stored by a specific user, the job list request provider of the any given first child unit transmits the job list request to the any given one parent unit stored in the parent unit connection information item, the job list request including an identification information item for the specific user. When the job list request obtainer of the any given one parent unit obtains the job list request, the print job responder: obtains the job list information item stored on the first memory and including the job name of the one or more print data items stored by the specific user identified with the identification information item included in the job list request; and transmits the job list response, including the obtained job list information item, to the any given first child unit that has transmitted the job list request.

The any given first child unit further includes: a print information request provider that, when the job name of the one or more print data items to be printed out with the any given first child unit is selected from the job list information item caused to be displayed by the job list display unit, transmits a print information request to the any given one parent unit storing the selected one or more print data items, the print information request including the job name of the selected one or more print data items and requesting transmission of the selected one or more print data items to the any given first child unit; and a print information obtainer that obtains a print response information item as a reply to the print information request. The any given one parent unit further includes a print information response provider that transmits the print response information item to the any given first child unit that has transmitted the print information request, the print response information item identified with the job name of the selected one or more print data items and including the one or more print data items stored on the first memory. When the any given first child unit transmits the print information request to the any given one parent unit, and the any given one parent unit sends the print response information item back to the any given first child unit, the any given first child unit prints out the print data item included in the print response information item obtained by the print information obtainer.

The parent units and the child units included in the printing control system are separated into a plurality of groups, and one or more of the parent units and one or more of the child units are connectable and set as image forming apparatuses that belong to one of the groups. The parent unit connection information item stored on the second memory of each child unit stores information on one of the parent units that belongs to a same group that the child unit belongs to and information on one each of the parent units that belongs to the respective groups to which the child unit does not belong. The print job notifier of the parent unit storing the one or more print data items transmits the job list information item to an other one or more of the parent units that belong to a same group that the parent unit belongs to, the job list information item including the job name of the one or more print data items stored on the first memory of the parent unit. If the other one or more of the parent units that belong to the same group obtain the job list information item, the job list request provider of the any given first child unit transmits the job list request to the parent units stored in the parent unit connection information item. The print job responder of a parent unit, included in the parent units receiving the job list request and obtaining the job list information item requested by the any given first child unit, transmits the job list response to the any given first child unit as a reply to the obtained job list request, the job list response including the job list information item requested by the any given first child unit.

The parent units and the child units included in the printing control system are separated into a plurality of groups, and one or more of the parent units and one or more of the child units are connectable and set as image forming apparatuses that belong to one of the groups. Each of the parent units previously stores an other parent information item on the first memory, the other parent information item including: information on an other one or more of the parent units that belong to a same group that the parent unit belongs to; and information on one each of the parent units that belong to the respective groups to which the parent unit does not belong to. The print job notifier of a parent unit "A", included in the parent units and storing the one or more print data items on the first memory, transmits the job list information item to the parent units stored in the other parent information for the parent unit "A", the job list information item including the job name of the one or more print data items stored on the first memory. A parent unit "B" included in the parent units obtains the job list information item transmitted from the parent unit "A", the parent unit "B" transmits the obtained job list information item to an other parent unit that is included in the parent units stored in the other parent unit information for the parent unit "B", and that belongs to a same group that the parent unit "B" belong to, and the other parent unit receiving the job list information item from the parent unit "B" stores the job list information item on the first memory of the other parent unit. The job list request provider of the any given first child unit transmits the job list request to the parent unit stored in the parent unit connection information item for the any given first child unit. The print job responder, of the parent unit obtaining the job list request, transmits the job list response to the any given first child unit as a reply to the obtained job list request, the job list response including the job list information item stored on the memory of the parent unit and requested from the any given first child unit.

An aspect of the present invention provides image forming apparatuses set as the parent units included in the printing control system in any one of the printing control systems described above.

The aspect of the present invention provides image forming apparatuses set as the child units included in the printing control system in any one of the printing control systems described above.

An aspect of the present invention provides a method for controlling printing performed by a printing control system including a plurality of image forming apparatuses set as parent units and a plurality of image forming apparatuses set as child units, all of which are connected together through a network. The method includes: a saving step of saving one or more print data items on at least any given first parent unit included in the parent units; a job list creating step of creating a job list information item including a job name of the one or more print data items, the job list information item being created by the any given first unit saving the one or more print data items; a job list distributing step of distributing the created job list information item to a parent unit included in the parent units and set in an other parent information item previously stored on the any given first unit; a job list receiving step of receiving the distributed job list information item by, and storing the distributed job list information item on, the parent unit set in the other parent unit information item; a job list requesting step of requesting for transmission of a job list request from any given first child unit included in the child units to one parent unit included in the parent units, the job list request requesting for transmission of the job list information item, including the job name of the one or more print data items, to the any given first child unit, and the one parent unit being set in a parent unit connection information item previously stored on the any given first child unit; a job list request obtaining step of obtaining the job list request by the one parent unit set in the parent unit connection information item; a print job response step of transmitting a job list response, by the one parent unit obtaining the job list request, to the any given first child unit as a reply to the obtained job list request, the job list response including the job list information item stored on the one parent unit and including the job name of the one or more print data item requested by the job list request from the any given first child unit; and a job list response obtaining step of obtaining, by the any given first child unit, the job list response to be sent back from the one parent unit to which the job list request has been transmitted.

According to an aspect of the present invention, the parent unit includes: the print job notifier that transmits, to an other parent unit, the job list information item including a job name of a stored print data item; the job list obtainer that obtains the job list information item transmitted from the other parent unit and stores the job list information item; and the print job responder that transmits, to a child unit, a job list response, including the requested job list information item, as a reply to the job list request transmitted from the child unit. Hence, the child unit can obtain the job list response from a parent unit not storing the print data item. Even if a plurality of image forming apparatuses are connected to a network, the image forming apparatuses include many parent units capable of storing a print data item created by a user, and both of the connectable parent units and child units are connected together in large number through the network, the present invention can reduce the load on both the parent units and the child units. In the present invention, the user can print out the print data easily and quickly, using an image forming apparatus not storing the print data. Thus, the present invention can be highly convenient for the user.

BRIEF DESCRIPTION OF THE DRAWINGS

FIG. 4A is a table showing an example of information (a self-setting information item) to be stored on a memory of a parent unit among the image forming apparatuses according to the present invention;

FIG. 4B is a table showing an example of information (a self-setting information item) to be stored on a memory of a child unit among the image forming apparatuses according to the present invention;

FIG. 5A is a table showing an example of information (an other parent unit information item) to be stored on a memory of a parent unit among the image forming apparatuses according to the present invention;

FIG. 5B is a table showing an example of information (a parent unit connection information item) to be stored on the memory of a child unit among the image forming apparatuses according to the present invention;

FIG. 6 is a table showing an example of information (a print information item) to be stored on a memory of a parent unit among the image forming apparatuses according to the present invention;

FIG. 7 is a table showing an example of information (a job list request) to be stored on a memory of a child unit among the image forming apparatuses according to the present invention;

FIG. 8A is a table showing an example of information (a job list information item) to be stored on the memory of a parent unit among the image forming apparatuses according to the present invention;

FIG. 8B is a table showing an example of information (a job list response) to be stored on the memory of a parent unit among the image forming apparatuses according to the present invention;

FIG. 9 is a table showing an example of information (a print information request) to be stored on the memory of a child unit among the image forming apparatuses according to the present invention;

FIG. 10 is a table showing an example of information (a print response information item) to be stored on the memory of a parent unit among the image forming apparatuses according to the present invention;

FIG. 11 is a table showing an example (Example 2) of image forming apparatuses according to the present invention, the image forming apparatuses including child units whose memory stores a parent unit connection information item in which information on two parent units is set and stored;

FIG. 12A is a diagram illustrating an example (Example 3) of a corresponding relationship between connectable parent units and child units for each of groups;

FIG. 12B is a table showing an example (Example 3) of image forming apparatuses according to the present invention, the image forming apparatuses including child units whose memory stores a parent unit connection information item in which information on one of the parent units in each group is set and stored;

FIG. 12C is a table showing an example (Example 3) of image forming apparatuses according to the present invention, the image forming apparatuses including parent units whose memory stores an other parent unit information item in which information on an other parent unit in the same group is set and stored;

FIG. 13A is a table showing an example (Example 4) of image forming apparatuses according to the present invention, the image forming apparatuses including parent units whose memory stores an other parent unit information item in which information on parent units in and out of a group is set and stored;

FIG. 14 is a view showing an example of a job list display screen to be displayed on a display of a child unit among the image forming apparatuses according to the present invention;

DETAILED DESCRIPTION OF THE INVENTION

Hereinafter described are embodiments of the present invention, with reference to the drawings. Note that the description of the examples below shall not limit the present invention.

A printing control system according to the present invention includes a plurality of image forming apparatuses connected to a network.

In particular, the present invention is directed to a printing control system including a plurality of image forming apparatuses set as parent units and a plurality of image forming apparatuses set as child units, all of which are connected together through a network.

An image forming apparatus (hereinafter also referred to as a multifunction peripheral, or an MFP) processes image data. The image forming apparatus is an electronic device capable of, for example, copying, printing, document scanning, document editing, document saving, document transmitting (faxing), and performing communications.

All of the image forming apparatuses have the same image processing functions. Some of the image forming apparatuses are initially set by default to parent units, and others to child units.

An image forming apparatus serving as a parent unit (hereinafter simply referred to as a parent unit) has a function in particular to temporarily save print data transmitted from information processing apparatuses such as a personal computer and a mobile terminal of a user.

Meanwhile, an image forming apparatus serving as a child unit (hereinafter simply referred to as a child unit) has functions to obtain the print data and print out the print data on, for example, printing paper.

Moreover, similar to the child unit, the parent unit also has the function to print out the print data on, for example, printing paper.

Furthermore, information processing apparatuses such as a personal computer and a mobile terminal of the user are also included in the printing control system, and serve as devices to transmit the print data to the parent unit.

In addition, communications processing executed by the printing control system according to the present invention is also applicable to a communications control system including a plurality of information processing apparatuses connected to a network. In the communications control system, the information processing apparatuses serve as a plurality of parent units and a plurality of child units connected together in association with each other, and transmit and receive information such as print data therebetween.

Examples of the information processing apparatuses include various apparatuses such as a personal computer, a communications apparatus, a display device, and an image forming apparatus. The embodiments below are applicable to any of the information processing apparatuses.

Figure 1:
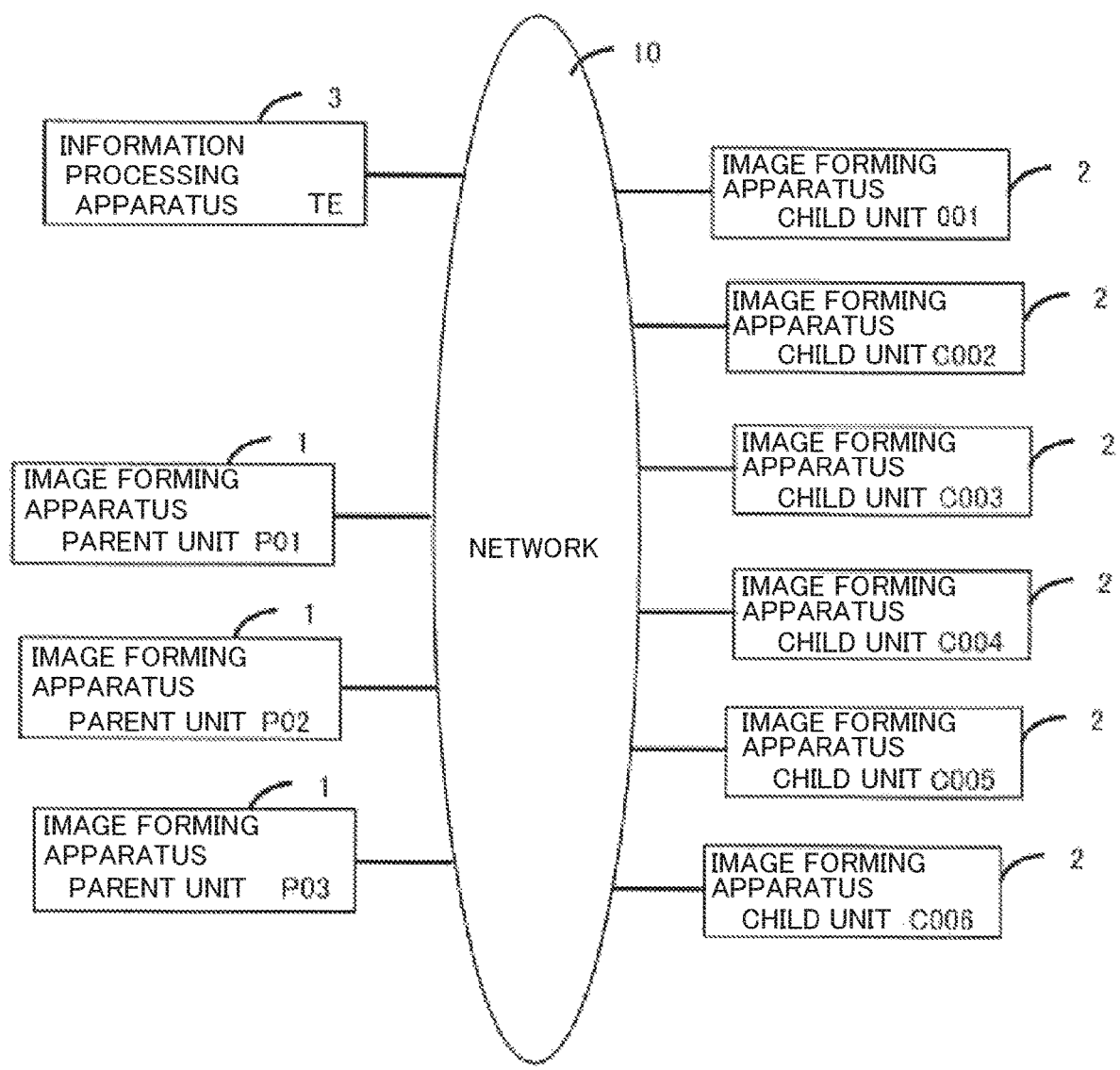
FIG. 1 is a diagram illustrating an example of a printing control system according to the present invention.

Configuration of the Printing Control System According to an Aspect of the Present Invention FIG. 1 is a diagram illustrating an example of a printing control system according to the present invention.

As illustrated in FIG. 1, the printing control system according to the present invention includes: parent units (MFP-P) 1; child units (MFP-C) 2; and an information processing apparatus (TE) 3, all of which are connected together through a network 10.

As described above, each of the parent units (MFP-P) 1 is an image forming apparatus capable of temporarily saving print data. The printing control system includes one or more parent units (P01, P02, and, P03).

As described above, each of the child units (MFP-C) 2 is an image forming apparatus capable of outputting the print data. The printing control system includes one or more child units (C001 to C006).

The information processing apparatus (TE) 3, owned by a user who prints out the print data, stores, for example, document information created by the user and image information obtained by the user.

In printing out the document information created with the information processing apparatus TE, the user may directly transmit the document information to the image forming apparatus to print out the document information.

Note that if a plurality of document information items are to be printed out later at a time, the document information items may be, for example, converted into print data items in a printable format, transmitted from the information processing apparatus TE to a predetermined parent unit 1, and stored on the parent unit 1.

The print data items are temporarily saved on a predetermined parent unit 1 until printed out with any one of the parent units or of the child units. After printed out, the print data items are deleted from the predetermined parent unit 1.

The parent unit 1 manages print data for each of the users. One or more print data items temporarily stored are referred to as a print job for each user.

The parent units 1, the child units 2, and the information processing apparatus 3 can perform data communications with one another through the network 10.

The number of the parent units 1, the child units 2, and the information processing apparatus 3 to be connected to the network 10 shall not be limited to the number in FIG. 1. Any given number of the parent units 1, the child units 2, and the information processing apparatus 3 may be connected to the network 10.

The network 10 may be any given conventional communications network such as a local area network (LAN) and a wide area communications network including the Internet. The communications may be held either by wire or wirelessly.

Configuration of a Parent Unit Among the Image Forming Apparatuses

Figure 2:
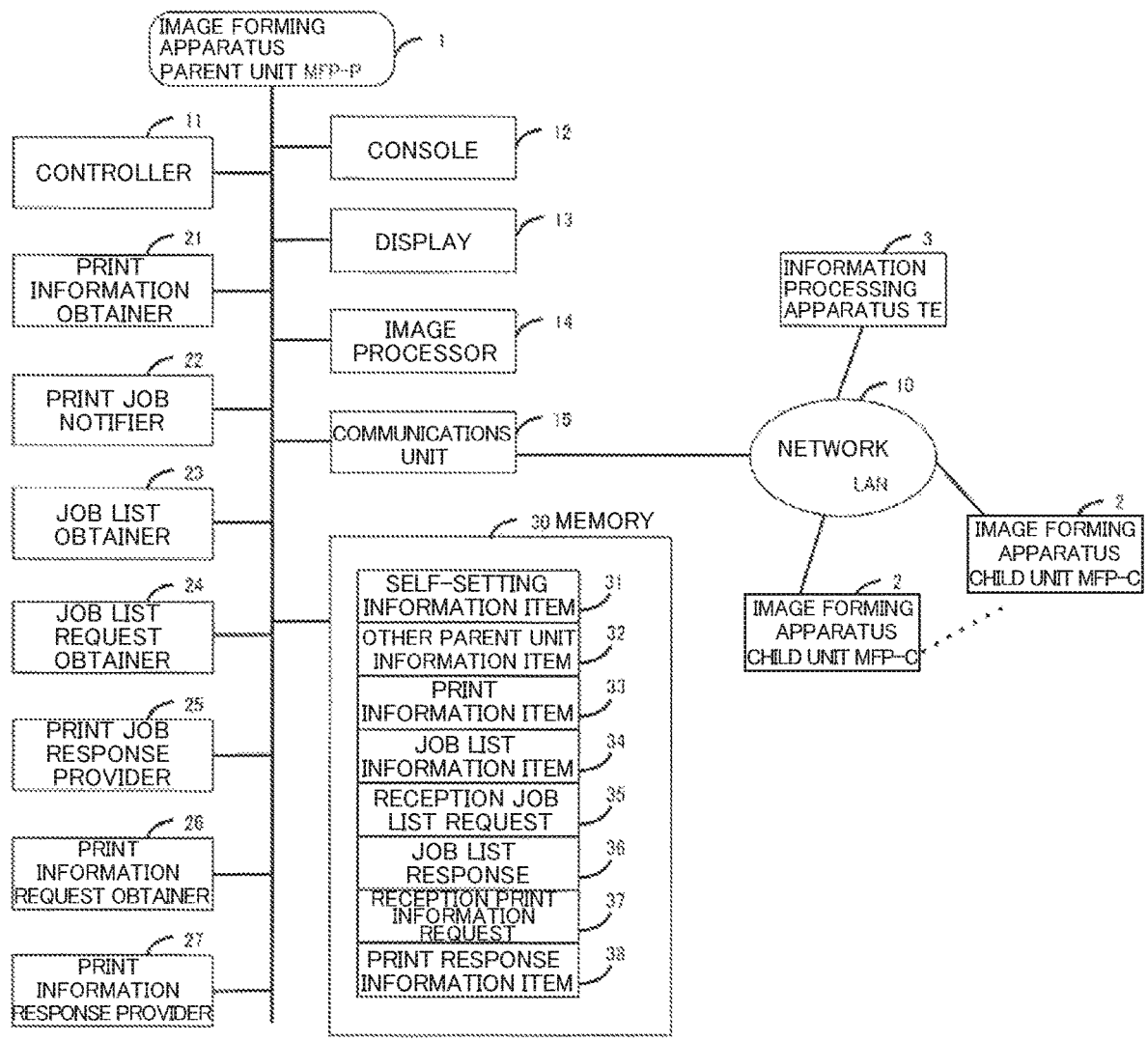
FIG. 2 is a block diagram illustrating a configuration of an example of a parent unit among image forming apparatuses according to the present invention.

FIG. 2 is a block diagram illustrating a configuration of an example of a parent unit among image forming apparatuses according to the present invention.

As illustrated in FIG. 2, through the network 10 such as a LAN, a parent unit 1 (MFP-P) 1 of the image forming apparatuses can connect to the child units 2 and the information processing apparatus 3 to perform data communications.

In FIG. 2, the parent unit (MFP-P) 1 mainly includes: a controller 11; a console 12; a display 13; an image processor 14; a communications unit 15; a print information obtainer 21; a print job notifier 22; a job list obtainer 23; a job list request obtainer 24; a print job responder 25; a print information request obtainer 26; a print information response provider 27; and a memory 30.

The memory 30 corresponds to a first memory storing one or more print data items described above.

The controller 11 controls operations of such constituent features as the console and the image processor. Mainly, the controller 11 is a microcomputer including a central processing unit (a CPU), a read-only memory (a ROM), a random-access memory (a RAM), an input-output (I/O) controller, and a timer.

The CPU organically operates various kinds of hardware in accordance with a control program previously stored on, for example, a ROM, and executes a function of the present invention such as an image processing function.

The console 12 is used by a user of the parent unit to input information. The console 12 is an input device for the user to perform a predetermined input operation to operate the parent unit. For example, the console 12 is used to input such information as a character and a selection of a function. The console 12 includes a keyboard, a mouse, and a touch panel.

The keys that the user operates include an operation start key, a function selection key, and a setting key.

For example, the user performs an input operation through the touch panel and the start key for scanning operation to cause the parent unit to carry out such functions as a print item setting function and a print function.

The display 13 notifies the user of information necessary to carry out the functions and of results of the carried out functions. For example, if the display 13 is an LCD or an organic EL display, and the console 12 is a touch panel, the display 13 is provided on the touch panel.

Using, for example, characters, signs, figures, images, icons, animations, and moving images, the display 13 displays, for example, settings of setting items to be used for, for example, a print job of an image forming apparatus, information necessary to carry out such a function as a document scanning function, an operation screen for a selected function, and an operation screen for setting a print item.

The image processor 14 carries out an image forming function; that is, a main function of an image forming apparatus serving as the parent unit. The image processor 14 mainly includes: an image input unit; an image formation unit; and an image output unit.

The image input unit mainly inputs predetermined image data. The image formation unit mainly converts the input image data into information in, for example, a printable form. The image output unit mainly outputs, for example, the formed print information to, for example, printing paper.

The image input unit inputs image data of a document including, for example, an image, a character, and a figure. The image input unit, for example, scans a document placed on, for example, a platen.

The image input unit is a scanner (a reader) scanning a document including information.

To scan a document, the image forming apparatus includes: a document placing platform (a platen) on which the document is placed; and a document cover to hold the document.

The image forming apparatus may also include an automatic document feeder (an ADF) housing a plurality of documents, and automatically feeding and scanning the documents one by one.

In such a case, the documents including, for example, images are read by a scanner, and the image data of the documents is stored on the memory 30.

There are various techniques to input image information.

For example, the image information to be input may be transmitted through the network from the information processing apparatus TE such as a personal computer and a mobile terminal of the user, and a server.

Moreover, an interface to connect to an external storage medium such as a USB memory corresponds to the image input unit.

The image information may also be input as follows. An electronic data file of, for example, image information to be input is previously stored on an external storage medium such as a USB memory. The USB memory is connected to an input interface such as a USB terminal, and the user carries out a predetermined input operation on the console 12. Hence, a desired electronic data file is read out of the USB memory and stored on the memory 30 as input image data.

In printing the input image data on a recording medium, for example, the image formation unit typically and sequentially carries out such steps as charging, exposing, developing, transferring, cleaning, removing static charge, and fixing to form the input image data on the recording medium.

In developing, toner is supplied from a toner cartridge to a developing apparatus. An electrostatic latent image is formed and developed on a surface of a charged photoconductive drum. Hence, a toner image is formed to correspond to the electrostatic latent image. The toner image formed on the surface of the photoconductive drum is transferred to the recording medium by a transfer apparatus. After that, a fixing apparatus heats and fixes the toner image on the recording medium.

Moreover, the image formation unit converts the input image data into transferable and displayable information.

The image output unit outputs the formed input image data. The image output unit corresponds to, for example, a printer printing information such as the input image data.

The image output unit prints out input image data, in a scanned document, on predetermined printing paper (in print form).

Note that the form of outputting the input image data shall not be limited to printing, and includes storing and faxing the input image data in the scanned document.

For example, outputting the image also includes storing the input image data, in the scanned document, on an external storage medium such as a USB, and transmitting the input image data to another information processing apparatus and a server through a network such as the Internet.

The communications unit 15 transmits and receives information through a network, and performs data communications with an image forming apparatus set as a child unit, a mobile terminal of the user, and another information processing apparatus.

For example, the communications unit 15 receives an electronic data file transferred from the information processing apparatus TE such as a personal computer and a mobile terminal of the user, and a server.

Moreover, the communications unit 15 transfers the input image data, input into the parent unit 1, to an external storage device (such as a USB memory) connected to the parent unit 1, and transmits the input image data, through the network 10, to a child unit and to the information processing apparatus TE such as a personal computer of the user and a server into which the document is input.

In particular, as will be described later in an aspect of this invention, the communications unit 15 of a parent unit transmits to a child unit a job list response and a print response information item, and receives from a child unit a job list request and a print information request.

The print information obtainer 21 obtains, from the information processing apparatus TE, data that the user would like to print out (also referred to as a print data item, a print file, or a print job) such as a document and an image created by the user.

Moreover, for example, the print information obtainer 21 associates a print data item with, for example, a job name, a user name, a date and a time of creation, and a print setting of the print data item, and stores on the memory 30 the print data item as a print information item.

A print information item 33 to be stored on the memory 30 is, for example, information illustrated in FIG. 6 to be shown later.

The information processing apparatus TE is, for example, a mobile terminal of the user. The user creates a print data item with the mobile terminal TE. When the user desires to create a print data item and temporarily store the created print data item, the user operates the mobile terminal TE to transmit the print data item to a predetermined parent unit.

The information processing apparatus TE previously stores information (e.g., an IP address) on one or more of the parent units to be connectable.

If two or more of the parent units are connectable using the information processing apparatus TE, the user may either previously designate a parent unit to which the print data item is transmitted, or prioritize the parent units to which the print data item is transmitted.

Alternatively, every time the print data item is transmitted, the user may select from among the parent units a desired parent unit to which the print data item is transmitted.

The print job notifier 22 transmits, to an other parent unit, a job list information item including a job name (hereinafter also referred to as a saved job name) of the print data item temporarily stored on the memory 30 of the parent unit.

The print job notifier 22 of a parent unit transmits the job list information item to, and notifies, an other parent unit that the memory 30 of the parent unit stores a print data item of the user.

As to be shown later in FIG. 8A, the job list information item mainly includes a user name, a saving parent unit name, and a saved job name of a print data item. The job list information item does not include the print data item per se.

Moreover, the parent unit temporarily saving the print data item of the user also stores the job list information item transmitted to the memory 30 of the parent unit itself.

The parent unit to transmit the job list information item is previously set in an other parent unit information item 32 in FIG. 5A to be shown later.

For example, as shown in FIG. 1, if three parent units (P01, P02, and P03) are connected to the network, the parent unit P01 stores an other parent information item in which information on the other parent units is previously set and stored.

If the parent unit P01 temporarily stores a print data item of the user, the parent unit P01 generates a job list information item including, for example, a saved job name of the print data item. The parent unit P01 transmits the job list information item to the other two parent units (P02 and P03).

Likewise, if the parent unit P03 temporarily stores a print data item of the user, the parent unit P03 transmits the job list information item to the other two parent units (P01 and P02).

Moreover, if many parent units of four or more are connected to the network, the many parent units may be separated into several groups, such that the parent units in a single group may mutually transmit and receive job list information items.

The job list obtainer 23 obtains a job list information item transmitted from an other parent unit. The obtained job list information item is stored on the memory 30 of the parent unit.

The obtained job list information item includes a user name, a saving parent unit name, and a saved job name of a print data item. Using the job list information item, the user can check which user's print data item is stored on which parent unit.

For example, if the job list information item includes a user name US1111, a saving parent unit name P01, and a saved job name F101 of a print data item, the job list information item shows that the parent unit P01 stores the print data item having the saved job name "F101", and that the print data item is stored by the user having the user name "US1111".

When the job list information item is distributed to a parent unit set and stored in the other parent unit information item, the user can check information, regarding a print data item stored on an other parent unit, not only with the source parent unit storing the print data item but also with the destination parent unit.

Hence, the job list information item is distributed to the mutually connectable parent units set and stored in the other parent unit information item. Thus, as to be described later, when there are a plurality of parent units connectable from one child unit, if the user cannot identify which one of the connectable parent units saves the print data item stored by the user, the one child unit transmits an inquiry (a job list request) to one of the parent units so that the user can identify which parent unit saves the print data item, using the child unit.

That is, the child unit does not have to send an inquiry to the parent units other than the parent unit to which the job list request has been transmitted. Such a feature can reduce the number of inquiries and reduce load on the child unit and the parent units.

The job list request obtainer 24 obtains a job list request transmitted from a child unit or an other parent unit.

The job list request in FIG. 7 to be shown later is information to request transmission of a job list information item to, for example, a child unit that has transmitted the job list request. The job list information item includes a job name of a print data item temporarily stored on the parent unit.

The job list request includes a user name of a specific user.

For example, when the user operates any given first child unit among the child units to select the print function, the first child unit transmits a job list request to a specific one of the parent units. The job list request requests the one parent unit to transmit, to the first child unit, a job list information item including a job name of a print data item stored by the user.

The job list request obtainer 24 of this specific parent unit obtains the job list request transmitted from the first child unit.

The specific parent unit to which the job list request is transmitted is previously set and stored in a parent unit connection information item 72 saved on a child unit, as illustrated in FIG. 5B.

The parent unit obtaining the job list request checks the job list information items stored on the memory 30 of the parent unit itself. If the parent unit finds a job list information item including the requested user name, the parent unit obtains a saved job name included in the job list information item, and creates a job list. The job list includes at least a user name included in the job list request, a saving parent unit name, and a saved job name. The job list may include the same information as the above job list information item.

If two or more print data items are stored by the user on the parent unit, the job list to be created includes the job names of the two or more print data items.

The job list does not include a file per se; that is, an actual print data item.

The saving parent unit name in the job list is an identification information item on the parent unit storing a file; that is, an actual print data item, and the saving parent unit name might be different from an identification information item on the parent unit obtaining the job list request.

Note that the job list is not created if the parent unit obtaining the job list request does not have a job list information item including the user name included in the job list request.

In response to the obtained job list request, the print job responder 25 transmits a job list response to the child unit that has transmitted the job list request and to an other parent unit. The job list response includes the job list information item requested from the child unit.

The job list response is information in FIG. 8B to be shown later. The job list response includes a user name in the job list, a saving parent unit name, and a saved job name.

The print job responder 25 transmits the job list response to, for example, the child unit that has transmitted the job list request, and notifies the child unit of the parent unit having the print data item stored by the user and of the saved job name of the print data item stored on the parent unit.

The print information request obtainer 26 obtains a print information request transmitted from a child unit or an other parent unit.

The print information request is a data item requesting transmission of a print data item stored on the parent unit to the child unit that has transmitted the print information request or to an other parent unit. The print information request is information in FIG. 9 to be shown later.

The print information request includes a job name (a request job name) of a print data item to be transmitted.

When the parent unit obtains the print information request, the parent unit reads, from the memory 30, the print data item identified with a request job ID, and transmits the print data item to the child unit that has transmitted the print information request.

The print information response provider 27 transmits a print response information item to the child unit that has transmitted the print information request, or to an other parent unit. The print response information item, a reply to the obtained print information request, includes a print data item that is identified with the job ID of the print data item selected with the child unit, and that is stored on the memory 30 of the parent unit.

Here, the print information response provider 27 creates the print response information item including the print data item to be identified with the request job ID included in the obtained print information request.

The print response information item may include the above print information item 33, as illustrated in FIG. 10 to be shown later.

The child unit receiving the print response information item obtains a print data item from the print information item included in this print response information item, and prints out the print data item on predetermined printing paper.

The memory 30 stores information and a program required to carry out the functions of the parent units of the present invention. The memory 30 is, for example, a semi-conductor storage element such as a ROM, a RAM, and a flash memory, a storage device such as an HDD and an SDD, and other storage media.

The memory 30 stores, for example, a self-setting information item 31, the other parent unit information item 32, the print information item 33, a job list information item 34, a reception job list request 35, a job list response 36, a reception print information request 37, and a print response information item 38.

The self-setting information item 31 indicates that the image forming apparatus is a parent unit. When this printing control system starts to operate, and when a new parent unit is introduced into the printing control system, the self-setting information item 31 is previously set and stored by a manager of the printing control system.

FIG. 4A is a table showing an example of information (a self-setting information item) to be stored on the memory 30 of a parent unit.

For example, the self-setting information item 31 in FIG. 4A includes, but not limited to, an identification information item, an apparatus type, an IP address, and a group name.

The identification information item is to identify the image forming apparatus, and to distinguish the image forming apparatus from an other image forming apparatus that belongs to the printing control system. The identification information item is, for example, an apparatus name and a number unique to the apparatus. In FIG. 4A, an identification information item "P01" is set.

The apparatus type is information for setting the image forming apparatus to a parent unit.

As illustrated in FIG. 4A, for example, if the apparatus type "parent unit" is set, the image forming apparatus functions as a parent unit.

The IP address is information assigned to each of the communications appliances connected to the network 10 in order to identify the communications appliance. Commonly, either a global IP address or a private IP address is set for each of the image forming apparatuses. The self-setting information 31 in FIG. 4A indicates that this parent unit has an IP address "192.168.10.1".

Note that this IP address may be used as the identification information item described above.

The group name is information to identify a group that the parent unit belongs to.

In the self-setting information item 31 in FIG. 4A, a group name "G1" is set. It means that this parent unit P01 belongs to the group "G1".

When there are many image forming apparatuses connected to the network, a group is previously set to distinguish a plurality of connectable image forming apparatuses.

Among the parent units and the child units included in the printing control system, one or more connectable parent units and one or more connectable child units are previously set as image forming apparatuses that belong to one group.

For example, if one organization includes a plurality of departments, a group may be set for each of the departments, and a plurality of image forming apparatuses owned by each department may have the same group name.

Moreover, if one organization is dispersed among multiple floors in a building, a group may be set for each of the floors, and a plurality of image forming apparatuses installed on each floor may have the same group name.

The image forming apparatuses that belong to one group include one or more parent units and one or more child units.

Note that if no group is set, the self-setting information item 31 does not have to store the group name.

The other parent unit information item 32 previously stores information on one or more connectable other parent units.

The parent units stored here can perform information communications. The print job notifier 22 transmits the above job list information item to, for example, the parent units stored in the other parent unit information item 32.

FIG. 5A is a table showing an example of the other parent unit information item 32 to be stored on the memory 30 of a parent unit.

The other parent unit information item 32 in FIG. 5A is stored on the parent units P01 and P02. Here, as illustrated in FIG. 1, three parent units (P01, P02, and P03) are connected to the network, and are capable of communicating with one another.

The other parent unit information item 32 in FIG. 5A includes a parent unit identification information item and an IP address.

For example, the other parent unit information item 32 stored on the parent unit P01 stores information regarding two parent units. The parent unit P02 having an IP address of "192.168.10.2" and the parent unit P03 having an IP address of "192.168.10.3" are connectable to the parent unit P01.

Furthermore, the other parent unit information item 32 stored on the parent unit P02 stores information regarding two parent units. The parent unit P01 having an IP address of "192.168.10.1" and the parent unit P03 having an IP address of "192.168.10.3" are connectable to the parent unit P02.

When the other parent unit information item 32 is stored; that is, for example, when the parent unit P02 temporarily stores a print data item, the job list information item regarding the print data item is distributed to the two parent units (P01 and P03) stored in the other parent unit information item 32.

The print information item 33 is on a print data item transmitted from the information processing apparatus TE. The print information item 33 is temporarily stored until any one of the child units or of the parent units finishes printing out the print data item.

This print information item 33 is used to carry out printing with, for example, a child unit.

FIG. 6 is a table showing an example of information (a print information item) to be stored on the memory 30 of a parent unit.

The print information item 33 in FIG. 6 stores a user name, a job name, a date, and a print setting. The print information item 33 also stores a print data per se of the job name.

The first print information item 33 in FIG. 6 stores a print data item stored by a user whose user name is US1111, on Sep. 11, 2020, under a job name of "F101". The print setting of the print data item is "color, paper size: A4, and number of copies: 1".

Moreover, the second information item 33 in FIG. 6 stores a print data item stored by a user whose user name is US2222, on Sep. 12, 2020, under a job name of "F202". The print setting of the print data item is "black and white, paper size: A4, and number of copies: 3".

Note that the details of the print setting can be changed when the print data item is actually printed out later, and the print setting does not have to be included in the print information item 33.

The job list information item 34 is on a print data item temporarily stored on the parent unit. As described above, the job list information item 34 mainly includes a user name, a saving parent unit name, and a saved job name of a print data item. The job list information item 34 does not include the print data item per se.

FIG. 8A is a table showing an example of the job list information item 34 to be stored on the memory 30 of a parent unit.

The job list information item in FIG. 8A stores the user name "US1111", the saving parent unit name "P03", and names of three files (F101, F012, and F103) as the saved job names of the print data items.

This job list information item 34 shows that a parent unit having the saving parent unit name "P03" stores three print data items (saved job names: F101, F102, and F103) stored by a user having the user name "US1111,".

The reception job list request 35, which is information received by the parent unit, is transmitted from a child unit and an other parent unit.

The job list request, an information item in FIG. 7 to be shown later, requests the parent unit to transmit a list (a job list) to a child unit that has transmitted the job list request. The job list includes a job name of a print data item stored by the user.

The job list response 36 is information included in a reply to the job list request.

As can be seen, if the parent unit has a print data item, the job list response 36 includes a job list including the saved job name of the print data item stored by a designated user. The job list response 36 does not include the print data item per se.

FIG. 8B is a table showing an example of the job list response 36 to be stored on the memory 30 of a parent unit.

The job list response 36 in FIG. 8B includes, but not limited to, a parent unit name, a destination child unit name, a user name, a saving parent unit name, and a saved job name. The saved parent name is information to identify a parent unit storing the print data item. Instead of the name of the parent unit, the ID number or the IP address of the parent unit may be included.

Here, the user name, the saving parent unit name, and the saved job name correspond to the job list information item 34.

For example, the job list response 36 in FIG. 8B is transmitted from a parent unit having the parent unit name "P02" to a child unit having the destination child unit name "C006". The job list response 36 indicates that a parent unit having the saving parent unit name "P03" temporarily stores three print data items stored by a user whose user name is "US1111", and that the saved job names of the print job data items are "F101", "F102", and "F103".

The job list response does not include the print data item per se, making it possible to reduce an amount of communications traffic for the job list response. Moreover, at the moment of transmitting the job list response, a print data item not to be printed out later is not transmitted to a child unit, making it possible to reduce a waste of communication processing.

The reception print information request 37, which is information received by the parent unit, is transmitted from a child unit and an other parent unit. The print information request, an information item in FIG. 9 to be shown later, requests transmission of a designated print data item among the print data items temporarily stored on the parent unit to the child unit that has transmitted the print information request.

The print response information item 38 is included in a reply to the print information request.

FIG. 10 is a table showing an example of the print response information item 38 to be stored on the memory 30 of a parent unit.

The print response information item 38 in FIG. 10 includes a parent unit name, a destination child unit name, a user name, a print job name, a date, and a print setting. The print response information item 38 may also include a print data item per se identified with the print job name. However, the print response information item 38 is not limited to the above information items.

The user name, the print job name, the date, the print setting, and the print data item correspond to the print information item 33 stored on the parent unit.

In FIG. 10, for example, the print response information item 38 is transmitted from a parent unit having the parent unit name "P02" to a child unit having the destination child unit name "C006". The print response information item 38 indicates to include two print data items stored by the user of the user name "US1111", with a print setting of "color, paper size: A4, and number of copies: 1". The two print data items has the print job names of "F101" and "F103".

As can be seen, the print response information item 38 is transmitted to, for example, a child unit that has transmitted a print information request. The child unit receiving the print response information item 38 prints out, on predetermined printing paper, a print data item included in the print response information item 38.

Figure 3:
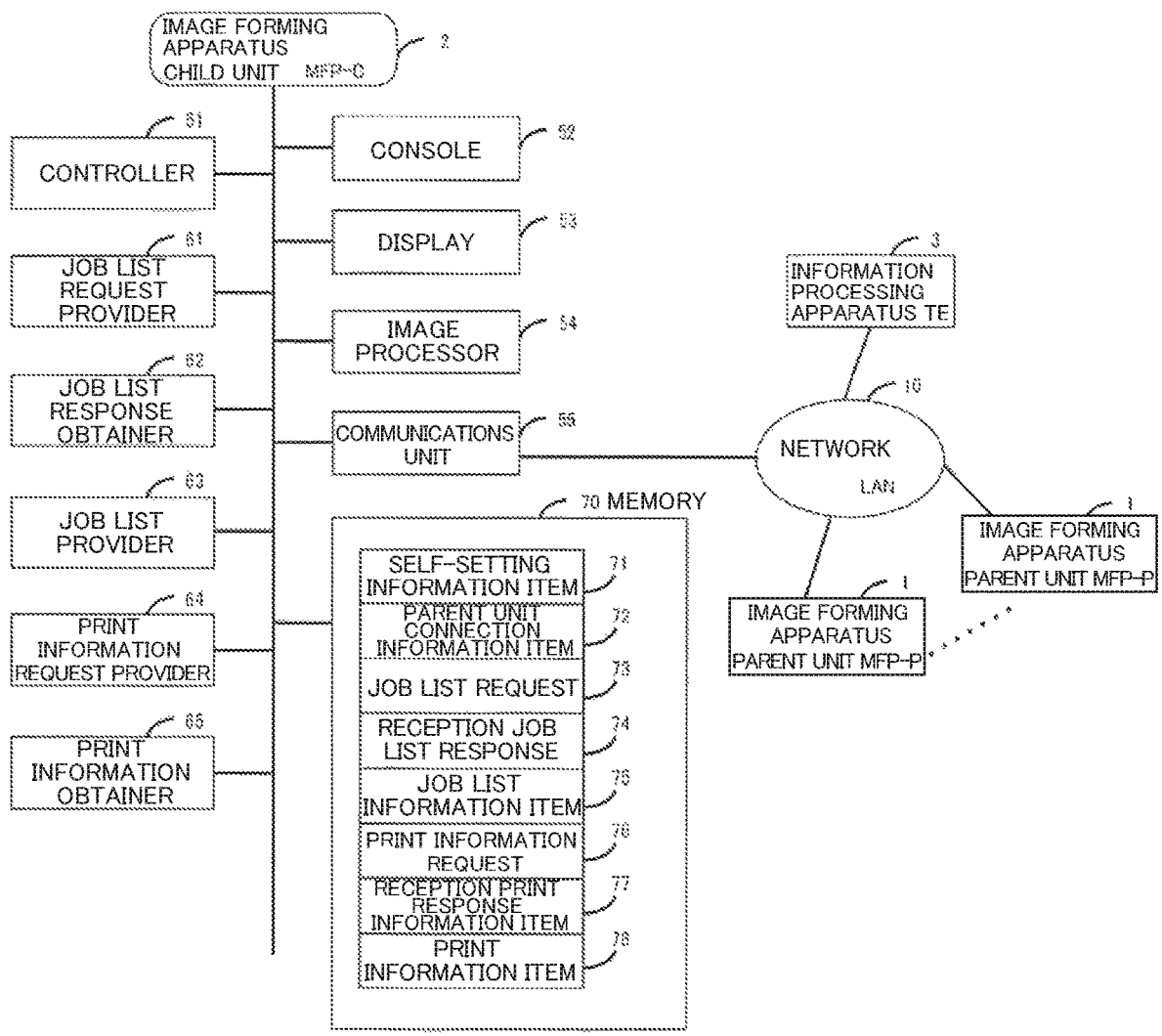
FIG. 3 is a block diagram illustrating a configuration of an example of a child unit among the image forming apparatuses according to the present invention.

Configuration of a Child Unit among the Image Forming Apparatuses FIG. 3 is a block diagram illustrating a configuration of an example of a child unit among the image forming apparatuses according to the present invention.

Similar to a parent unit, a child unit (MFP-C) 2 among the image forming apparatuses is an electronic device capable of copying and performing communications.

As illustrated in FIG. 3, the child unit 2 can connect to the parent units 1 and the information processing apparatus 3 to perform data communications through the network 10 such as a LAN.

In FIG. 3, the child unit (MFP-C) 2 mainly includes: a controller 51; a console 52; a display 53; an image processor 54; a communications unit 55, a job list request provider 61; a job list response obtainer 62; a job list display unit 63; a print information request provider 64; a print information obtainer 65; and a memory 70.

The memory 70 corresponds to a second memory.

Similar to the controller 11 of the parent unit, the controller 51 controls operations of such constituent features as the console and the image processor. Mainly, the controller 51 is a microcomputer including a CPU, a ROM, a RAM, an I/O controller, and a timer.

Moreover, the console 52, the display 53, the image processor 54, and the communications unit 55 are also the same in functions as those of the parent unit, and will not be elaborated upon here.

Similar to the image processor 14 of the parent unit, the image processor 54 mainly includes: an image input unit; an image formation unit; and an image output unit.

The job list request provider 61 transmits a job list request from the child unit to a parent unit.

As described above, the job list request is a data item to request transmission, to the child unit, of a saved job name of a print data item stored by a predetermined user. The job list request is transmitted to the parent units stored in a parent unit connection information item 72 to be described later.

In transmitting the job list request to a connectable parent unit, the child unit obtains from the connectable parent unit a job list information item including the job name of the print data item stored by the user.

For example, the parent unit connection information item 72 in FIG. 5B shown later stores information on one parent unit for each of the child units. In this case, the child unit transmits the job list request only to this one parent unit stored in the parent unit connection information item 72.

When transmitting the job list request to the parent unit stored in the parent unit connection information item 72, the child unit cannot determine whether the parent unit stores the print data item to be identified with the job name of the print data item included in the job list information item requested by the job list request, or the parent unit does not store the print data item.

Even though the parent units and the child units are connected to the network and capable of holding communications with one another, the transmission of the job list request from the child units is restricted to one of the parent units stored in the parent unit connection information item 72. Such a feature makes it possible to reduce load of the job list request transmission on the child units, and to reduce an amount of communications traffic in transmitting the job list request.

Moreover, if the parent units and the child units included in the printing control system are separated into several groups, and connectable one or more of the parent units and connectable one or more of the child units are set as image forming apparatuses that belong to one group, the parent unit connection information item 72 stored on the memory 70 of each child unit may store information for one or more of the parent units that belong to the same group that the one or more of the child units belong to. The job list request provider 61 of the child unit may transmit the job list request to any given one of the parent units stored in the parent unit connection information items 72.

The job list response obtainer 62 obtains a job list response sent back from the parent unit to which the job list request has been transmitted. Here, the child unit that has transmitted the job list request obtains the job list response from any one of the parent units either storing the print data item to be identified with the job name of the print data item included in the job list information item requested by the job list request, or not storing the print data item.

As can be seen, the parent unit receiving the job list request transmits the job list response, as a reply to the job list request, to the child unit that has transmitted the job list request.

The parent unit receiving the job list request might not store the print data item.

The job list response includes a user name, a saving parent unit name, and a saved job name. Thus, the child unit checks the job list response to find out the parent unit on which the print data item is stored by the user, and the job name of the stored print data item.

Moreover, the job list response includes the saved job name. The display 53 of the child unit displays the saved job name so that the user can select a print data item that he or she would like to print out.

The job list display unit 63 causes the display 53 of the child unit to display the job list information item included in the job list response obtained by the job list response obtainer 62.

The job list information item includes a saved job name of a print data item for a designated user. The job list display unit 63 causes the display 53 to display this saved job name.

For example, the display 53 displays a job list display screen in FIG. 14 to be shown later.

When the user selects a print function as an input with a child unit, the child unit transmits a job list request to a parent unit previously set in the parent unit connection information item 72. The parent unit transmits a job list response including the job list information item.

When the child unit obtains the job list response, the display 53 of the child unit displays a job list display screen including a saved job name identifying the print data item for the user.

The job list display screen in FIG. 14 displays a job list of print data items stored by the user "US1111" on a parent unit whose parent unit name is "P02".

This job list displays job names of three print data items, and the job names are DAILY REPORT (F101), PROPOSAL (F102), and REPORT (F103).

The user checks the display and understands that the three print data items for the user are stored on the parent unit P02. Hence, from among the three print data items, the user can select a file that he or she would like to print out.

The job list response obtainer 62 obtains the job list response to be sent back from the parent unit to which the job list request has been transmitted. After that, the job list display unit causes the display 53 to display the job list included in the obtained job list response.

The print information request provider 64 transmits a print information request from the child unit to a parent unit.

For example, when a job name of a print data item to be printed out with the child unit is selected from the job list information item caused to be displayed by the job list display unit 63, the print information request provider 64 transmits a print information request to a parent unit storing the selected print data item. The print information request includes the job name of the selected print data item and requests transmission of the selected print data item to the child unit.

The parent unit storing the selected print data item is identified with a saving parent unit name (or an IP address) included in the job list response.

That is, the print information request is transmitted not to the parent unit that has transmitted the job list response but to the parent unit storing the selected print data item per se.

As illustrated in FIG. 9 to be shown later, the print information request includes a destination parent unit name, a user name, and a requested job name.

The print information request provider 64 transmits this print information request, and requests the parent unit identified with the destination parent unit name to transmit, to the child unit, the print data item identified with the user name and the requested job name.

When receiving the print information request, the parent unit identified with the destination parent unit name transmits, to the child unit that has transmitted the print information request, a print response information item including the requested print data item.

The print information obtainer 65 obtains the print response information item as a reply to the print information request.

As illustrated in FIG. 10 shown above, the obtained print response information item (a reception print response information item 77) includes print information items including a user name, a print job name, and a print data item per se.

In the child unit, the image processor 54 uses these print information items to print out the print data item.

That is, when the child unit transmits the print information request to a parent unit, and, after that, the parent unit sends the print response information item back to the child unit, the child unit prints out the print data item included in the print response information item obtained by the print information obtainer 65.

The memory 70 stores information and a program required to carry out the functions of the child units of the present invention. The memory 70 is, for example, a semiconductor storage element such as a ROM, a RAM, and a flash memory, a storage device such as an HDD and an SDD, and other storage media.

The memory 70 stores, for example, a self-setting information item 71, the parent unit connection information item 72, a job list request 73, a reception job list response 74, a job list information item 75, a print information request 76, the reception print response information item 77, and a print information item 78.

The self-setting information item 71 indicates that the image forming apparatus is a child unit. When this printing control system starts to operate, and when a new child unit is introduced into the printing control system, the self-setting information item 71 is previously set and stored by a manager of the printing control system.

FIG. 4B is a table showing an example of the self-setting information item 71 to be stored on the memory 70 of a child unit.

For example, the self-setting information item 71 in FIG. 4B includes, but not limited to, an identification information item, an apparatus type, an IP address, and a group name.

The identification information item is to identify the image forming apparatus, and to distinguish the image forming apparatus from another image forming apparatus that belongs to the printing control system. The identification information item is, for example, an apparatus name and a number unique to the apparatus. In FIG. 4B, an identification information item "C001" is set.

The apparatus type is information for setting the image forming apparatus to a child unit.

As illustrated in FIG. 4B, for example, if the apparatus type "child unit" is set, the image forming apparatus functions as a child unit.

The IP address is information assigned to each of the communications appliances connected to the network 10 in order to identify the appliance. Commonly, either a global IP address or a private IP address is set for each of the image forming apparatuses.

The self-setting information 71 in FIG. 4B indicates that this child unit has an IP address "192.168.10.51".

Note that this IP address may be used as the identification information item described above.

The group name is information to identify a group that the child unit belongs to.

In the self-setting information item 71 in FIG. 4B, a group name "G1" is set. It means that this child unit C001 belongs to the group "G1".

When there are many image forming apparatuses connected to the network, a group is previously set to distinguish a plurality of connectable image forming apparatuses.

Note that if no group is set, the self-setting information item 71 does not have to store the group name.

The parent unit P01 in FIG. 4A and the child unit C001 in FIG. 4B both have the group name "G1", and belong to the same group.

The parent unit connection information item 72 identifies a connectable parent unit.

The child unit can transmit and receive information to and from a parent unit set in the parent unit connection information item 72.

FIG. 5B is a table showing an example of the self-setting information item 72 to be stored on the memory 70 of a child unit.

The parent unit connection information item 72 in FIG. 5B includes, but not limited to, a parent unit identification information item and an IP address.

The IP address alone may be used as the parent unit connection information item 72.

The parent unit identification information item corresponds to an identification information item (an apparatus name) in the above self-setting information item 31.

FIG. 5B shows the parent unit connection information item 72 for six child units. The parent unit connection information item 72 for each of the child units stores one parent unit identification information item and one IP address. For example, the parent unit connection information item 72 for child units C001 and C002 stores a parent unit identification information item P01 and an IP address (192.168.10.1). The child units C001 and C002 can transmit a job list request to the parent unit P01.

Moreover, the parent unit connection information item 72 for child units C003 and C004 stores a parent unit identification information item P02 and an IP address (192.168.10.2). The child units C003 and C004 can transmit a job list request to the parent unit P02.

Likewise, the parent unit connection information item 72 for child units C005 and C006 stores a parent unit identification information item P03 and an IP address (192.168.10.3). The child units C005 and C006 can transmit a job list request to the parent unit P03.

As described above, the job list request 73 is data to request a parent unit to send a job name of a print data item stored by the user to, for example, a child unit that has transmitted the job list request.

FIG. 7 is a table showing an example of the job list request 73 to be stored on the memory of a child unit.

The job list request 73 in FIG. 7 includes, but not limited to, a request apparatus name, a destination parent unit name, a user name, and a request detail.

The request detail indicates a condition to be requested to the parent unit. If requested is a job list of a specific user, for example, the request detail to be set is "JOB LIST OF USER".

The request apparatus name is a name of a child unit transmitting a job list request, and may be the IP address of the child unit.

The destination parent name is a name of a parent unit to be requested to transmit a job list information item, and may be the IP address of the parent unit.

The user name designates an owner of a print data item temporarily stored on a parent unit.

If the request detail of the job list request 73 is "JOB LIST OF USER", it means that requested is a job list information item including a job name of a print data item stored by a user having a designated user name.

FIG. 7 shows an example of two job list requests 73.

The first job list request 73 is transmitted from the child unit C006 to the parent unit P01. The request apparatus name is C006. The destination parent unit name is P01. The user name is US1111. The request detail is "JOB LIST OF USER".

This job list request 73 requests the parent unit P01 to transmit, to the child unit C006, a job list information item including a job name of a print data item stored by a user having the user name US1111.

The second job list request 73 is transmitted from the child unit C006 to the parent unit P02. This job list request 73 requests the parent unit P02 to transmit, to the child unit C006, a job list information item including a job name of a print data item stored by the user having the user name US1111.

The parent unit to which the job list request 73 is transmitted and the parent unit storing a print data item stored by the user having the user name US1111 may be either the same or different.

Even though the parent unit to which the job list request 73 is transmitted does not store a print data item stored by the user having the user name US1111, if the parent unit stores a job list information item regarding the print data item stored by the user, the parent unit that has received the job list request 73 can transmit, to the child unit C006, the job list information item including the job name of the print data item stored by the user.

If a condition other than a specific user is to be set to request a job list information item, another condition may be set for the request detail.

For example, if requested is a job list information item only for a file having a specific document name, the request detail to be set is "JOB LIST FOR SPECIFIC DOCUMENT NAME". Other than the row of "USER NAME", a row "DOCUMENT" may be provided, and a document name such as "REPORT" may be set.

Note that, if the job list request 73 is limited to request a job list information item for a specific user, the request detail may be omitted.

If a child unit requests parent units to transmit a job list information item having a job name of a print data item stored by a specific user, the job list request provider 61 of the child unit transmits the job list request, including an identification information item (e.g., a user name) on the user, to a parent unit stored in the parent unit connection information item 72. The details of this operation will be described later.

When the job list request obtainer 22 of the parent unit obtains the job list request, the print job responder 23 obtains, from among job list information items stored on the memory 30 of the parent unit, a job list information item including a job name of a print data item stored by a user identified with an identification information item, on the user, included in the job list request. Then, the parent unit transmits, to the child unit that has transmitted the job list request, a job list response including the obtained job list information item.

In response to the job list request 73 transmitted to the parent unit, the reception job list response 74 is a response detail sent back from the parent unit. The reception job list response 74 corresponds to the job list response 36 in FIG. 8B as described above.

The child unit checks the reception job list response 74 to find out which parent unit stores the print data item stored by the user, and obtains the saved job name of the print data item stored by the user.

The job list information item 75 is included in the reception job list response 74, and corresponds to the job list information 34 shown in FIG. 8A. The job list information item 75 includes a user name, a saving parent unit name, and a saved job name.

The print information request 76 is information to request a parent unit for a print data item to be printed out with a child unit.

For example, when the user operates a child unit to select the job name of a file that he or she would like to print out from among the saved job names included in the job list information item, and to input print start, the print information request 76 is transmitted from the child unit to the parent unit.

FIG. 9 is a table showing an example of the print information request 76 to be stored on the memory 70 of a child unit.

The print information request 76 in FIG. 9 includes a child unit name, a destination parent unit name, a user name, a request job name, and a request detail.

The request detail is information indicating that the print information request 76 is data to request for transmission of a print file per se. For example, the print information request 76 is set with information "PRINT FILE".

The child unit name is identification information for a child unit transmitting the print information request 76. The destination parent unit name is identification information as to a parent unit to which the print information request 76 is transmitted.

The user name designates an owner of a print data item to be printed out.

The request job name designates a job name of a print data item to be printed out.

The user name and the request job name identify a print data item to be transmitted from the parent unit to the child unit.

FIG. 9 shows an example of two job list requests 76.

The first print information request 76 is transmitted from the child unit C006 to the parent unit P02. The child unit name is C006. The destination parent unit name is P02. The user name is US1111. The request job names are F101 and F103. The request detail is "PRINT FILE".

This print information request 76 requests the parent unit P02 to transmit, to the child unit C006, two print data items among the print data items temporarily stored on the parent unit P02. The two print data items are identified with the user name US1111 and the two request job names F101 and F103.

The second print information request 76 is transmitted from the child unit C004 to the parent unit P01. This print information request 76 requests the parent unit P01 to transmit, to the child unit C004, a print data item among the print data items temporarily stored on the parent unit P01. The print data item is identified with a user name US2222 and a request job name F201.

The reception print response information item 77 is the print response information item to be transmitted from a parent unit to a child unit as a reply to the print information request transmitted from the child unit to the parent unit.

The reception print response information item 77 corresponds to, for example, the print response information item 38 in FIG. 10 shown above.

The print information item 78 is included in the reception print response information item 77 transmitted from a parent unit to a child unit.

For example, as the above print response information item 38 shows in FIG. 10, the user name, the print job name, the date, the print setting, and the print data item per se correspond to the print information item 78.

The child unit uses this print information item 78 to print out the print data item.

Examples of How to Process Distribution of a Job List Information Item According to an Aspect of the Present Invention In an aspect of the present invention, as described above, when the print information item transmitted from the information processing apparatus TE is stored on a predetermined parent unit, the predetermined parent unit distributes a job list information item, generated from the print information item, to an other parent unit previously set in an other parent unit information item stored on the predetermined parent unit.

Moreover, using the job list information item, a parent unit obtaining a job list request from a child unit transmits, to the child unit, a job list response as a reply to the job list request. Hence, on the child unit, the user can check where the print data stored by him or her is and what the job name of the print data is.

Described below are some examples of how to process distribution of a job list information item.

Example 1

Described here is a printing control system in which a plurality of parent units and a plurality of child units, which are not grouped, are connected to the network 10 so that the parent units and the child units can hold communications with one another.

Figure 5C:
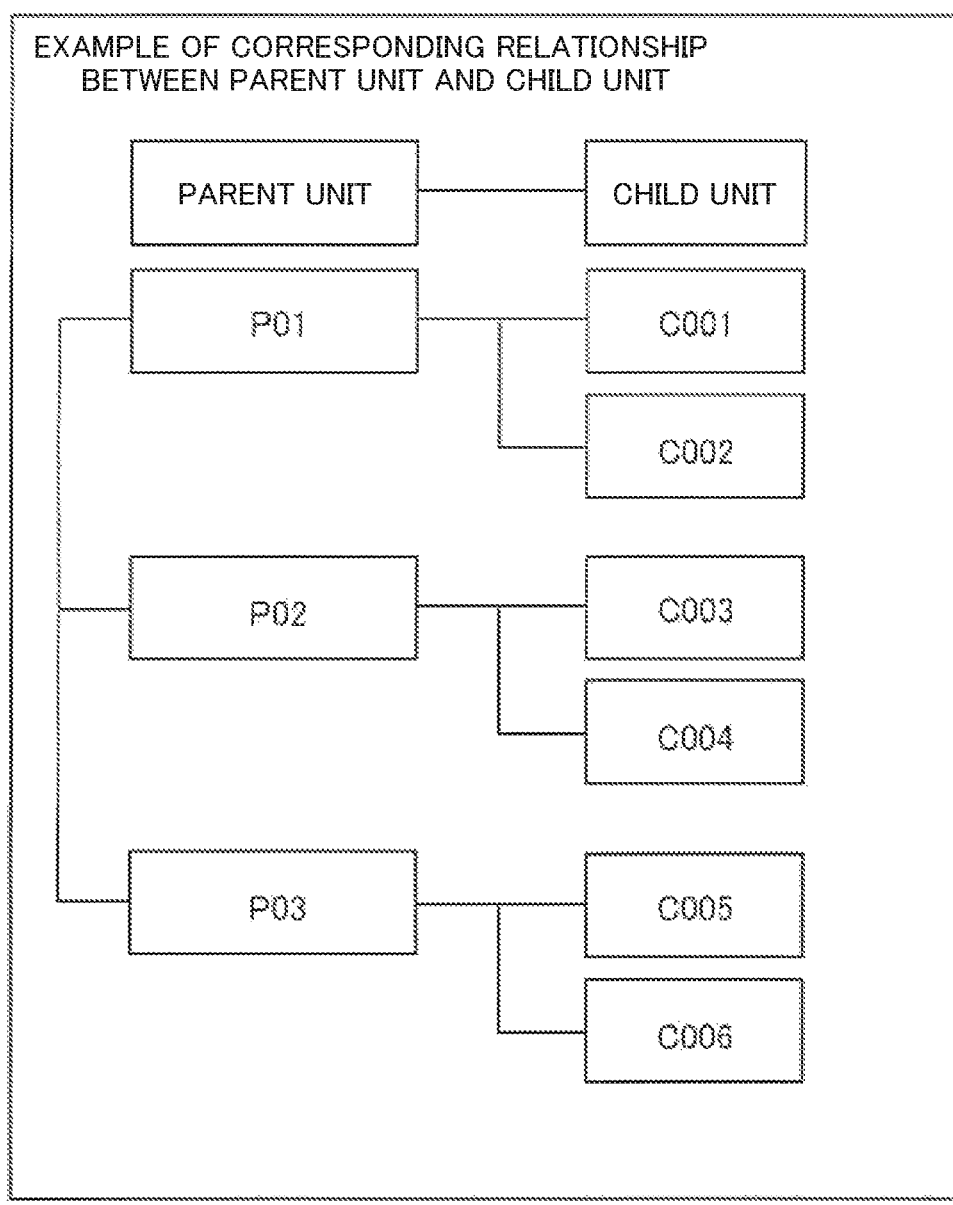
FIG. 5C is a diagram illustrating an example of a corresponding relationship between connectable parent units and child units.

FIG. 5C is a diagram illustrating an example of a corresponding relationship between connectable parent units and child units.

As shown in FIG. 1, three parent units (P01, P02, and P03) and six child units (C001, C002, C003, C004, C005, and C006) are connected to the network 10.

Moreover, each of the parent units previously stores the other parent unit information item 32 in FIG. 5A.

Furthermore, in the parent unit connection information item 72 for each of the child units, information on one parent unit as a connectable parent unit is previously set and stored. An example of the parent unit connection information item 72 is shown in FIG. 5B.

In this case, as shown in FIG. 5C, the three parent units can hold communications with one another; whereas, the connection between the child units and the parent units is limited.

For example, in the parent unit connection information item 72 for the child units C001 and C002, the parent unit P01 alone is set and stored. Hence, the destination of the job list request to be transmitted from the two child units (C001 and C002) is limited to the parent unit P01, and the job list request is not transmitted to the other parent units (P02 and P03).

Moreover, in the parent unit connection information item 72 for the child units C003 and C004, the parent unit P02 alone is set and stored. Hence, the destination of the job list request to be transmitted from the two child units is limited to the parent unit P02, and the job list request is not transmitted to the other parent units (P01 and P03).

Likewise, in the parent unit connection information item 72 for the child units C005 and C006, the parent unit P03 alone is set and stored. Hence, the destination of the job list request to be transmitted from the two child units is limited to the parent unit P03, and the job list request is not transmitted to the other parent units (P01 and P02).

Figure 5D:
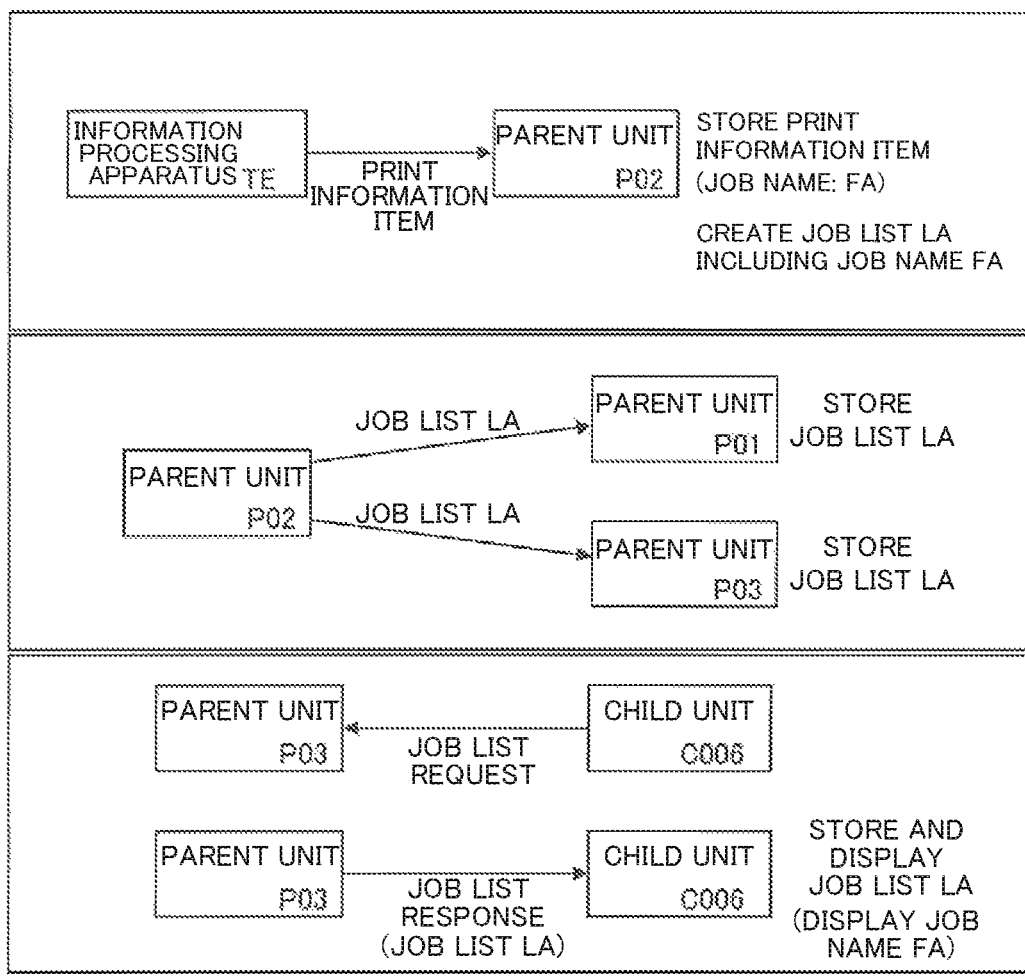
FIG. 5D is a diagram illustrating an example of how to process distribution of a job list information item between the connectable parent units and child units.

FIG. 5D is a diagram illustrating an example of how to process distribution of a job list information item when the three parent units (P01, P02, and P03) and the six child units (C001, C002, C003, C004, C005, and C006) are in the above corresponding relationship.

In FIG. 5D, first, the information processing apparatus TE transmits, to the parent unit P02, a print information item including a print data item of a user (the user name: US01). This print information item is stored on the parent unit P02.

This print data item has a job name "FA".

The print data item having the job name "FA" is temporarily saved on the parent unit P2.

The user operates the information processing apparatus TE to, for example, input a request to store the print data item on the parent unit P02, and the print information item including the print data item (the job name: FA) of the user is transmitted to the parent unit P02.

The parent unit P02 stores the print information item including the print data item (the job name: FA), and creates a job list information item (hereinafter referred to as a job list LA) including the job name FA of this print data item.

The job list LA includes the user name: US01, the saving parent unit name: P02, and the job name of the print data item: FA.

After that, the parent unit P02 distributes the job list LA including the job name FA to two parent units (P01 and P03) stored in the other parent unit information item 32 saved on the parent unit P02 and shown in the parent unit P02.

The two parent units (P01 and P03) stores the received job list LA.

At this moment, all of the three parent units (P01, P02, and P03) to which the child units can connect store the job list information item (the job list LA) including the job name FA of the print data item stored on the parent unit P02 by the user (the user name: US01). The print data per se is stored on the parent unit P02.

Next, the user (the user name: US01), who has stored the print data item on the parent unit P02, moves to the child unit C006. The user performs a predetermined log-in operation on the C006. When authenticated without any problem, the child unit C006 can connect to the three parent units. The user performs an input operation to select a print function.

When the user performs an input operation on a child unit to select the print function, the child unit transmits a job list request to a connectable parent unit.

As illustrated in FIG. 5B above, in the parent unit connection information item 72 for the child unit C006, the parent unit P03 alone is set and stored. Hence, the child unit C006 transmits the job list request to the parent unit P03. This job list request includes the request apparatus name: C006 and the user name: US01.

The parent unit P03 stores the above job list LA. When receiving this job list request, the parent unit P03 transmits, to the child unit C006, a job list response including the job list LA.

When receiving the job list response, the child unit C006 stores the job list LA and causes the display 53 to display the job list LA.

Hence, the child unit C006 presents a job list display screen including the job name FA of the print data item. The user (the user name: US01) at the child unit C006, for example, selects the displayed job name FA and operates the child unit C006 to input print start. Thus, the child unit C006 can print out the print data item stored by the user.

That is, when the user operates the child unit C006 to input print start, the child unit C006 transmits a print information request to the parent unit storing the print data item, and the parent unit storing the print data item sends a print response information item back to the child unit C006. Because the print data per se is included in the print response information item, the child unit C006 can print out the print data item.

In the above example, information on one parent unit as a connectable parent unit is previously set and stored in the parent unit connection information item 72 for each of the child units, and the job list request is transmitted to this one parent unit. However, setting and storing of the information shall not be limited to such a manner.

Information on two or more of the parent units as connectable parent units may be previously set and stored in the parent unit connection information item 72 for each of the child units, and the job list request may be transmitted to a given one of the parent units.

For example, among the parent units and the child units included in the printing control system, one or more connectable parent units and one or more connectable child units may be set as image forming apparatuses that belong to one group. The parent unit connection information item 72, which is stored on the memory 70 of each of the connectable child units, may store information regarding the one or more connectable parent units that belong to the same group as the connectable child units belong to. The job list request provider 61 may transmit a job list request to any given one of the connectable parent units stored in the parent unit connection information item 72.

Alternatively, if the parent unit connection information item 72, which is stored on the memory 70 of each of the connectable child units, stores the one or more connectable parent units that belong to the same group as the connectable child units belong to, the user may perform an operation to select one of the connectable parent units of his or her choice so that the job list request provider 61 may transmit a job list request to the selected one connectable parent unit.

Moreover, in this example, a plurality of child units are connected to a network to which a plurality of parent units are connected. The user operates any given one of the child units to select a print function. The any given child unit is different from a parent unit having a print data item stored by the user. Hence, the child unit can display a job name of the print data item of the user, and print out the print data item.

In such a case, the job list request to be transmitted from the child unit is transmitted to a previously set one parent unit alone. Such a feature makes it possible to reduce the amount of the communications traffic in the network to which the child units and the parent units are connected, and to reduce load on the parent units and the child units.

Example 2

In Example 1, as shown in FIG. 5B, each of the child units previously stores the parent unit connection information item 72 in which information on one parent unit is previously set. The child unit transmits a job list request only to the previously set one parent unit.

However, when a plurality of parent units connectable to the child unit is connected to the network, if the one parent unit previously set in the parent unit connection information 72 is suspended because of breakdown or maintenance, the parent unit might neither receive a job list request transmitted from the child unit, nor send a job list response back to the child unit.

Even if one of the parent units is suspended, the other parent units certainly store the job list information item. The child unit transmits the job list request to the other parent units not suspended, such that the job list response might be sent back to the child unit.

The parent units connected to the network could be simultaneously broken or could simultaneously undergo maintenance. However, the parent units are less likely to be simultaneously suspended.

Hence, in Example 2, each child unit previously stores the parent unit connection information item 72 in FIG. 11, and the child unit transmits a job list request to previously set two parent units.

In Example 2, as shown in FIG. 1, three parent units (P01, P02, and P03) and six child units (C001, C002, C003, C004, C005, and C006) are connected to the network 10.

FIG. 11 is a table showing an example of the parent unit connection information item stored on the memory 70 of a child unit. In the parent unit connection information item 72, information on two parent units is set and stored.

FIG. 11 shows that, in the parent unit connection information item 72 included in each of the six child units, information on two of the three parent units is stored.

For example, the parent unit connection information item 72 for the child unit C001 stores an identification information item on, and an IP address of, each of the parent units P01 and P02. The parent unit connection item 72 for the child unit C006 stores an identification information item on, and an IP address of, each of the parent units P03 and P01.

Hence, when the child unit C001 transmits a job list request, the job list request is transmitted to the two parent units (P01 and P02). When the child unit C006 transmits a job list request, the job list request is transmitted to the two parent units (P03 and P01).

As a technic to transmit the job list request, for example, the job list request may be substantially simultaneously transmitted to the two parent unit.

In this case, the two parent units send back job list responses created from the same job list information item. Hence, the child unit may use the job list response that the child unit has received first.

Alternatively, the two set parent units may be prioritized. First, the child unit may select a parent unit having higher priority, and transmit the job list request to the selected parent unit. After that, the child unit may select the other parent unit having lower priority, and transmit the job list request to the parent unit.

In this case, if the parent unit to which the job list request is transmitted first sends back a job list request, the child unit does not have to transmit the job list request to the parent unit with lower priority.

Note that if the parent unit having higher priority does not send a reply even after a certain time period has passed, the child unit may transmit the job list request to the parent unit having lower priority.

As can be seen, the parent unit connection information item 72 for each child unit previously stores information on two parent units, and the child unit transmits a job list request to the two parent units. Such a feature would increase the amount of communications traffic for transmitting the job list request; however, even if either one of the two parent units is suspended, the child unit can obtain a job list response from the other parent unit not suspended.

Note that the parent unit connection information item 72 for each child unit shall not be limited to store information for two parent units. The parent unit connection information item 72 may store information for three or more parent units.

If a plurality of parent units are connected to the network, and the child unit can hold communications with these parent units, the parent unit connection information item 72 may previously store information on the parent units that can hold communications with the child unit. For example, if there are ten parent units that can hold communications with the child unit, the parent unit connection information item 72 may previously store the information on the ten parent units.

In this case, for example, the child unit may select in turn each one of the parent units stored in the parent unit connection information item 72, and may sequentially transmit a job list request to the selected parent units. If a selected parent unit is not suspended, the parent unit can receive the job list request and send a job list response back to the child unit. Upon receiving the job list response, the child unit does not have to transmit the job list request to the rest of the parent units.

As can be seen, the parent unit connection information item 72 for each child unit previously stores information on the connectable parent units, and the child unit transmits a job list request to the parent units. Even if any one or more of the parent units are suspended, the child unit can obtain a job list response from a parent unit not suspended.

Note that if suspended is the parent unit per se storing the print data item stored by the user, the child unit cannot obtain the print data item per se even though the child unit can obtain the job list response.

Hence, if it is already known that the parent unit storing the print data item will be suspended because of, for example, maintenance, the parent unit may transmit, before suspended, such information as a suspending time period of the parent unit to the child units and the other parent units connected to the network. Thus, the parent unit may notify the child units and the other parent units that the print data item stored on the parent unit will be unavailable.

Alternatively, before the parent unit is suspended, the print data item stored on the parent unit may be duplicated on an other parent unit, and may be obtained from the other parent unit while the parent unit is suspended.

Example 3

Described here is a printing control system in which a plurality of parent units and a plurality of child units connected to a network are separated into several groups, and a job list information item is distributed not only within each of the groups but also out of the group.

The parent units and the child units included in the printing control system are separated into groups. One or more connectable parent units and one or more connectable child units are set as image forming apparatuses that belong to one group.

Moreover, in order to distribute a job list information item out of the one group, the parent unit connection information item 72 for each of the child units stores one each of the parent units that belong to the respective groups.

The parent units and the child units are separated into groups each for one of the floors on which the parent unis and child units are installed.

Described first is an outline of how to process distribution of a job list information item in Example 3.

The parent unit connection information item 72 stored on the memory 70 of each child unit stores information on one of the parent units that belong to the same group that the child unit belongs to and information on one each of the parent units that belong to the respective groups to which the child unit does not belong.

The print job notifier 22 of a parent unit storing a print data item transmits a job list information item to an other parent unit that belongs to the same group as the parent unit belongs to. The job list information item includes a job name of the print data item stored on the memory of the parent unit.

The other parent unit that belongs to the same group obtains this job list information item. Hence, a plurality of parent units that belong to the same group obtain the same job list information.

If the other parent units that belongs to the same group obtain the job list information item, the job list request provider 61 of any given child unit transmits a job list request to the parent units stored in the parent unit connection information item 72.

The print job responder 25 of a parent unit, included in the parent units receiving the job list request and obtaining the job list information item requested by the child unit, transmits a job list response to the child unit as a reply to the obtained job list request. The job list response includes the job list information item requested by the child unit.

Thanks to the feature, any given child unit can obtain a job list information item from a parent unit that belongs to a different group from the group of the child unit, and the job list information item can be distributed out of the group.

FIG. 12A is a diagram illustrating an example of a corresponding relationship between connectable parent units and child units for each of groups.

In FIG. 12A, the parent units and the child units are installed on three floors (a first floor, a second floor, and a third floor). Groups (G1, G2, and G3) are set for the respective floors.

Moreover, three parent units and six child units are installed on each floor (group), and two child units are set to connect to one parent unit.

For example, installed on the first floor are three parent units (P11, P12, and P13) and six child units (C011 to C016). These parent units and child units belong to the group G1.

Likewise, installed on the second floor are three parent units (P21, P22, and P23) and six child units (C021 to C026). These parent units and child units belong to the group G2.

FIG. 12B is a table showing an example of the parent unit connection information 72 stored on the memory 70 of a child unit. Set and stored in the parent unit connection information item 72 is information on one each of the parent units in the respective groups.

In FIG. 12B, the child unit C013 is installed on the first floor and belongs to the group GL. The parent unit connection information item 72 for the child unit C013 previously stores information (a parent unit identification information item and an IP address) regarding: the parent unit P12 included in the same group G1 and installed on the first floor; the parent unit P23 included in an other group G2 and installed on the second floor; and the parent unit P33 included in an other group G3 and installed on the third floor.

Moreover, the child unit C022 is installed on the second floor and belongs to the group G2. The parent unit connection information item 72 for the child unit C022 previously stores information (a parent unit identification information item and an IP address) regarding: the parent unit P12 included in an other group G1 and installed on the first floor; the parent unit P21 included in the same group G2 and installed on the second floor; and the parent unit P32 included in an other group G3 and installed on the third floor.

Likewise, the child unit C036 is installed on the third floor and belongs to the group G3. The parent unit connection information item 72 for the child unit C036 previously stores information (a parent unit identification information item and an IP address) regarding: the parent unit P11 included in an other group G1 and installed on the first floor; the parent unit P22 included in an other group G2 and installed on the second floor; and the parent unit P33 included in the same group G3 and installed on the third floor.

FIG. 12C is a table showing an example of the other parent unit information item 32 stored on the memory 30 of a child unit. Set and stored in the other parent unit information item is information on other parent units in the same group.

In FIG. 12C, the parent unit P11 is installed on the first floor and belongs to the group G1. The other parent unit information item 32 for the parent unit P11 previously stores information (a parent unit identification information item and an IP address) on the other two parent units (P12 and P13) that belong to the same group G1.

Likewise, the parent unit P33 is installed on the third floor and belongs to the group G3. The other parent unit information item 32 for the parent unit P33 previously stores information (a parent unit identification information item and an IP address) regarding the other two parent units (P31 and P32) that belong to the same group G3.

Moreover, the parent unit P22 is installed on the second floor and belongs to the group G2. The other parent unit information item 32 for the parent unit P22 previously stores information (a parent unit identification information item and an IP address) regarding the other two parent units (P21 and P23) that belong to the same group G2.

The other parent unit information item 32 shown in above FIG. 12C is stored on each of the parent units. When one of the parent units on each floor (each group) stores a print data item and creates a job list information item, the one of the parent units transmits the job list information item to the other parent units stored in the other parent unit information item 32 and included in the same group that the one parent unit belongs to.

Figure 12D:
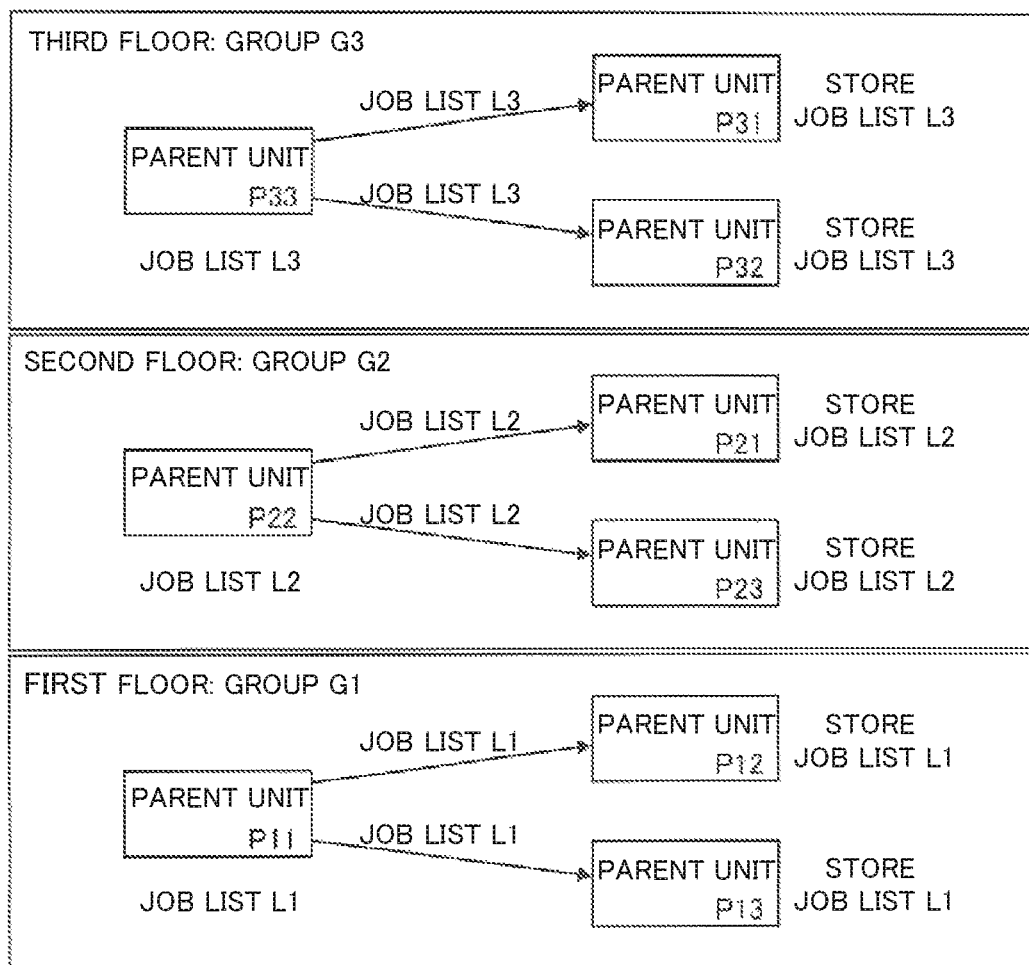
FIG. 12D is a diagram illustrating an example (Example 3) of distribution of a job list information item between connectable parent units in each of the groups.

FIG. 12D is a diagram illustrating an example of distribution of a job list information item between connectable parent units in each of the groups.

In FIG. 12D, for example, the parent unit P33 installed on the third floor (the group G3) creates a job list information item (a job list L3). Using the other parent information item 32 for the parent unit P33, the parent unit P33 transmits the job list L3 to the other two parent units (P31 and P32) that belong to the same group G3.

Likewise, the parent unit P22 installed on the second floor (the group G2) creates a job list information item (a job list L2). Using the other parent information item 32 for the parent unit P22, the parent unit P22 transmits the job list L2 to the other two parent units (P21 and P23) that belong to the same group G2.

Figure 12E:
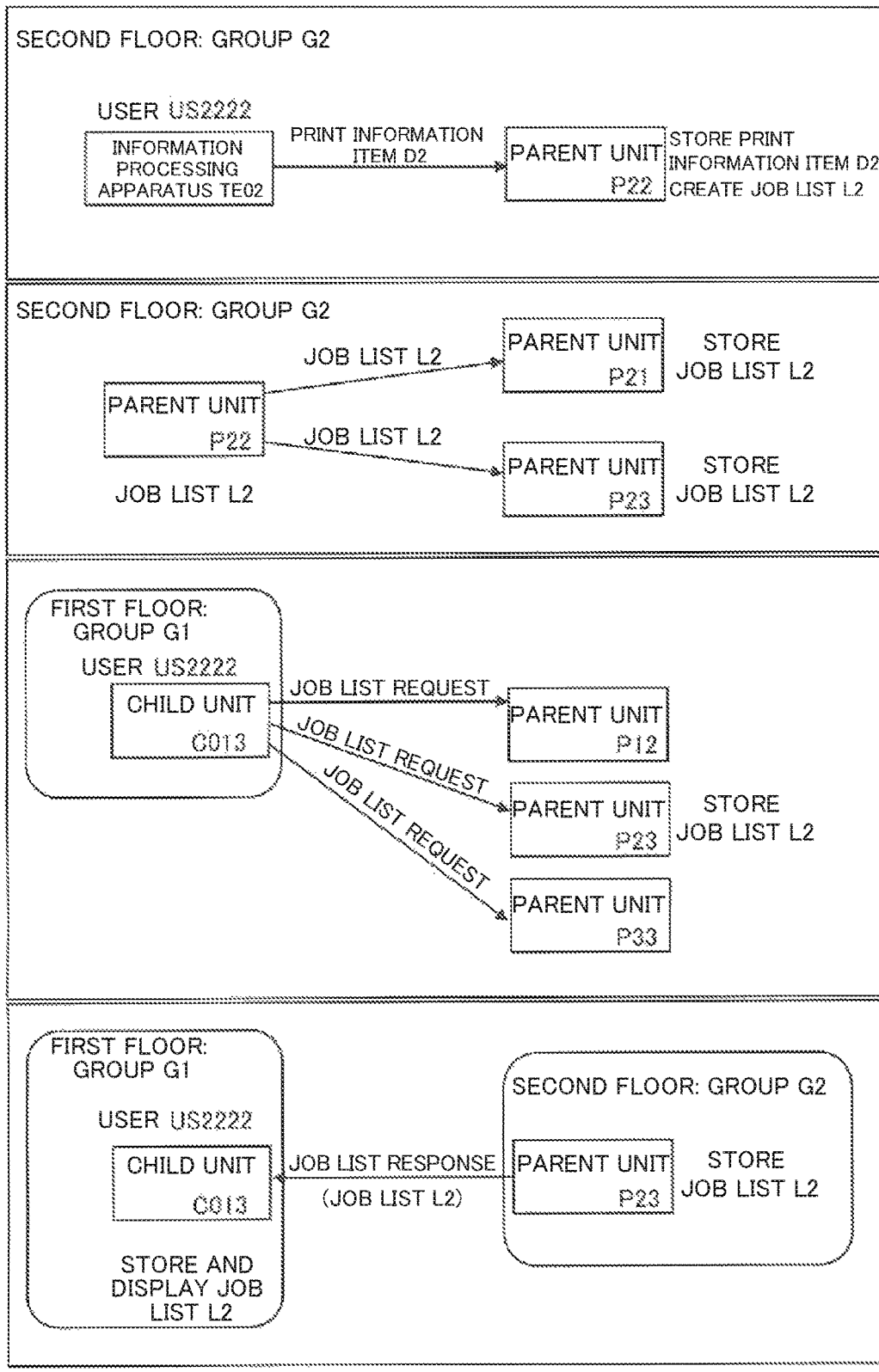
FIG. 12E is a diagram illustrating an example of how to process distribution of a job list to be distributed between the connectable parent units and child units out of the group.

FIG. 12E is a diagram illustrating an example of how to process distribution of a job list to be distributed between the connectable parent units and child units out of the group.

In FIG. 12E, first, a user US2222 performs an input operation on an information processing apparatus TE02 to create a print data item, and to cause the parent unit P22 in the group G2 to store a print information item D2 including the print data item.

Here, TE02 transmits, to the parent unit P22, the print information item D2 including the user name (US2222) and the print data item. The parent unit P22 temporarily stores the print information item D2.

That is, the print data item per se is temporarily stored on the parent unit P22 installed on the second floor.

Storing the print information item D2, the parent unit P22 creates a job list information item (the job list L2), using the print information item D2.

The job list L2 includes the user name (US2222), the saving parent unit name (P22), and a saved job name of the print data item.

Next, the parent unit P22 distributes the job list information item (the job list L2).

Using the other parent unit information item 32 for the parent unit P22 in FIG. 12C, the parent unit P22 distributes the job list L2 to the two parent units (P21 and P23) set in the other parent unit information item 32.

The two parent units (P21 and P23) store the job list L2.

Hence, the three parent units (P21, P22, and P23) that belong to the same group G2 (the second floor) store the job list L2 of the print data item stored by the user US2222.

After that, the user US2222 moves to the first floor. On the child unit C013 installed on the first floor, the user US2222 is authorized and logs in the child unit C013 to input and select a print function.

Upon receiving the input to select the print function, the child unit C013 reads out the parent unit connection information item 72 stored on the memory 70 of the child unit C013. The child unit C013 transmits a job list request including the user name (US2222) to parent units.

The child unit C013 stores the parent unit connection information item 72 for the child unit C013 shown in FIG. 12B. The child unit C013 transmits the job list request to the three parent units (P12, P23, and P33) stored in the parent unit connection information item 72.

Here, the child unit C013 transmits the job list request not only to the parent unit P12 included in the same group G1 and installed on the first floor where user US2222 is found. The child unit C013 also transmits the job list request out of the group G1 to parent units (P23 and P33) included in other groups and installed on the other floors.

In particular, the child unit C013 transmits the job list request to the parent unit P23 installed on the second floor (the group G2) and storing the job list L2 of the print data item stored by the user US2222.

The parent unit P23 receives the job list request requesting the job list of the user US2222. After that, the parent unit P23 transmits a job list response to the child unit C013 included in the group G1 and installed on the first floor. The job list response includes the job list L2, of the user US2222, stored on the parent unit P23.

When receiving the job list L2, the child unit C013 causes the display 53 of the child unit C013 to display a job list display screen including the job list L2.

The job list display screen displays the saved job name of the print data item included in the job list L2. Hence, the user US2222 at the child unit C013 can check the print data item stored by him or her.

After that, on the child unit C013, for example, the user US2222 selects and inputs the saved job name of the print data item as a file to be printed out. The child unit C013 transmits a print information request to the parent unit storing the print data item. Then, the parent unit storing the print data item sends a print response information item back to the child unit C013. Because the print data per se is included in the print response information item, the child unit C013 can print out the print data item.

Thanks to the above processing, the job list information item, including the saved job name of the print data item, is distributed out of the group to a child unit that belongs to a different group from the group of the parent unit storing the print data item. Hence, even if the user does not know the group name of the parent unit storing the print data item or the group name of the child unit executing a print job, the above features make it possible to readily execute processing including saving and printing the print data item, and to increase convenience for the user.

Example 4

In the printing control system of Example 3 described above, the parent unit connection information item 72 for each of the child units stores one each of the parent units that belong to the respective groups. The printing control system allows a job list information item to be distributed out of the group.

In an example to be described below, the other parent unit information item 32 stored on a parent unit stores not only the parent units that belong to the same group, but also one parent unit that belongs to an other group. Such a feature allows distribution of a job list information item out of the group.

This example also shows that, as illustrated in FIG. 12A, the parent units and the child units are installed on three floors. A group is set for each of the floors. For each group, connectable three parent units and six child units correspond to each other.

The parent units and the child units included in the printing control system are separated into groups. One or more connectable parent units and one or more connectable child units are set as image forming apparatuses that belong to one group.

Described first is an outline of how to process distribution of a job list information item in Example 4.

A parent unit previously stores the other parent information item 32 on the memory 30. The other parent information item 32 includes: information on the other parent units that belong to the same group that the parent unit belongs to; and information on one each of the parent units that belong to the respective groups to which the parent unit does not belong.

A parent unit "A" stores a print data item on the memory 30. The print job notifier 22 of the parent unit "A" transmits a job list information item to the parent units stored in the other parent information 32 for the parent unit "A". The job list information item includes a job name of the print data item stored on the memory 30.

A parent unit "B" obtains the job list information item transmitted from the parent unit "A". The parent unit "B" transmits the obtained job list to an other parent unit included in the parent units stored in the other parent unit information 32 for the parent unit "B". The other parent unit belongs to the same group that the parent unit "B" belong to.

Receiving the job list information item transmitted from the parent unit "B", the parent unit stores the job list information item to the memory 30 of the parent unit.

The job list request provider 61 of any given child unit transmits a job list request to a parent unit stored in the parent unit connection information item 72 for the child unit.

The print job responder 25, of the parent unit obtaining the job list request, transmits a job list response to the child unit as a reply to the obtained job list request. The job list response includes the job list information item stored on the memory 30 of the parent unit and requested from the child unit.

Thanks to the feature, any given child unit can obtain a job list information item from a parent unit that belongs to a different group from the group of the child unit, and the job list information item can be distributed out of the group.

FIG. 13A is a table showing an example of the other parent unit information item 32 stored on the memory 30 of a parent unit. In the other parent unit information item 32, information on parent units in and out of the group is set and stored.

In FIG. 13A, the parent unit P12 is installed on the first floor and belongs to the group G1. The other parent unit information item 32 for the parent unit P12 previously stores information (a parent unit identification information item and an IP address) regarding the other two parent units (P11 and P13) that belong to the same group G1, and further previously stores information (a parent unit identification information item and an IP address) regarding one each of the parent units that belong to the respective other groups. Here, the parent units that belong to the other groups are, for example, the parent unit P21 in the group G2 and the parent unit parent unit P31 in the group G3.

Moreover, the parent unit P21 is installed on the second floor and belongs to the group G2. The other parent unit information item 32 for the parent unit P21 previously stores information (a parent unit identification information item and an IP address) regarding the other two parent units (P22 and P23) that belong to the same group G2, and further previously stores information (a parent unit identification information item and an IP address) regarding one each of the parent units (e.g., the parent unit P12 in the group G1 and the parent unit P32 in the group G3) that belong to the respective other groups.

Likewise, the parent unit P31 is installed on the third floor and belongs to the group G3. The other parent unit information item 32 for the parent unit P31 previously stores information (a parent unit identification information item and an IP address) on the other two parent units (P32 and P33) that belong to the same group G3, and further previously stores information (a parent unit identification information item and an IP address) on one each of the parent units (e.g., the parent unit P13 in the group G1 and the parent unit P23 in the group G2) that belong to the respective other groups.

Figure 13B:
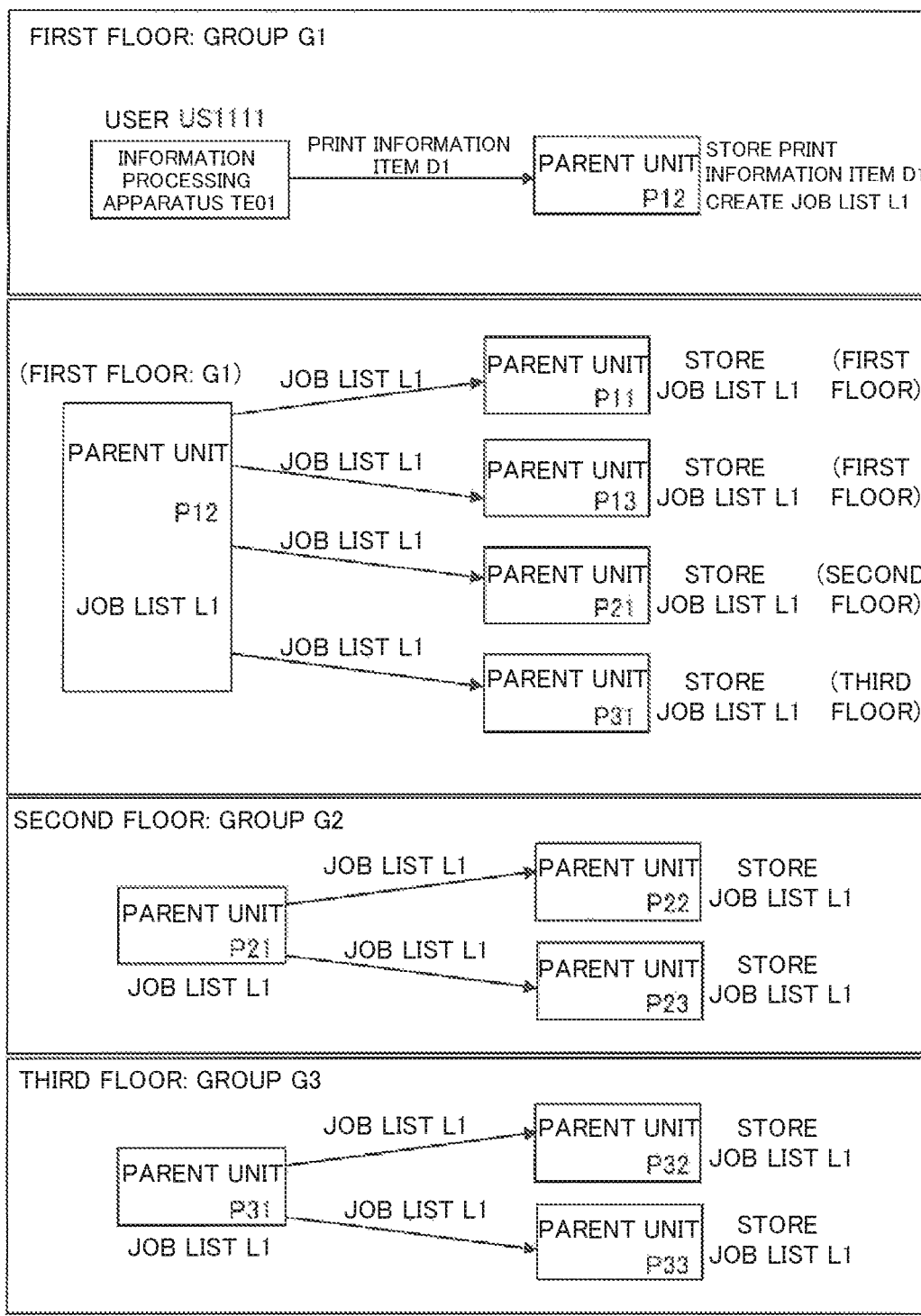
FIG. 13B is a diagram illustrating an example (Example 4) of how to process distribution of a job list information item to be distributed among the connectable parent units out of the group.

When the other parent unit information item 32 in FIG. 13A is stored on a parent unit, as shown in FIG. 13B, the job list information item created by a parent unit of one group is transmitted out of the one group to, and stored on, parent units of other groups.

FIG. 13B is a diagram illustrating an example of how to process distribution of a job list information item to be distributed among the connectable parent units out of the group.

In FIG. 13B, first, the user US1111 performs an input operation on the information processing apparatus TE01 to create a print data item, and to cause the parent unit P12 in the group G1 to store a print information item D1 including the print data item.

Here, the TE01 transmits, to the parent unit P12, the print information item D1 including the user name (US1111) and the print data item. The parent unit P12 temporarily stores the print information item D1.

That is, the print data item per se is temporarily stored on the parent unit P12 installed on the first floor.

Storing the print information item D1, the parent unit P12 creates a job list information item (the job list L1), using the print information item D1.

The job list L1 includes the user name (US1111), the saving parent unit name (P12), and a saved job name of the print data item.

Next, the parent unit P12 distributes the job list information item (the job list L1).

Using the other parent unit information item 32, the parent unit P12 distributes the job list L1 to the four parent units (P11, P13, P21 and P31) set in the other parent unit information item 32.

The four parent units (P11, P13, P21 and P31) store the job list L1.

Hence, the job list L1 of the print data item stored by the user US1111 is stored on: the three parent units (P11, P12, and P13) that belong to the same group G1 (on the first floor) as the parent unit P12 belongs to; one parent unit P21 that belongs to an other group G2 (on the second floor); and one parent unit P31 that belongs to an other group G3 (on the third floor).

Here, the two parent units (P21 and P31), to which the job list L1 is distributed from the parent unit P12 in the group G1, belongs to the other groups. Because the received job list L1 is distributed from a parent unit that belongs to an other group, each of the two parent units (P21 and P31) distributes the job list L1 to the other parent units that belong to the same group set in the other parent unit information item 32.

That is, the parent unit P21 that belongs to the group G2 (on the second floor) distributes the job list L1 to the other parent units (P22 and P23) that belong to the same group G2. Moreover, the parent unit P31 that belongs to the group G3 (on the third floor) distributes the job list L1 to the other parent units (P32 and P33) that belong to the same group G3.

Hence, the job list L1 is stored on the three parent units (P21, P22, and P23) that belong to the group G2 (on the second floor) and on the three parent units (P31, P32, and P33) that belong to the group G3 (on the third floor). As a result, the job list L1 is stored on the nine parent units installed on the three floors.

That is, the job list L1 is stored on the parent units that belong to each group.

Thus, in this condition, even if a child unit transmits a job list request to any parent unit in and out of the group of the child unit, a job list response is sent back to the child unit.

Figures 13C, 13D:
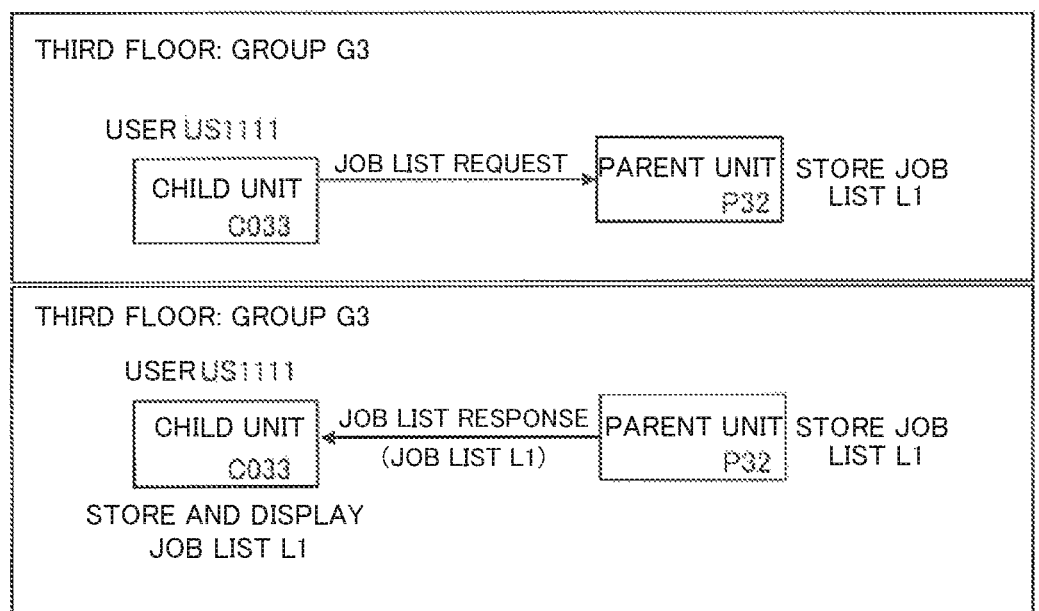
FIG. 13C is a table showing an example (Example 4) of image forming apparatuses according to the present invention, the image forming apparatuses including a child unit whose memory stores a parent unit connection information item in which information on one of the parent units in the same group is set and stored.
FIG. 13D is a diagram illustrating an example (Example 4) of how to process distribution of a job list information item between a connectable parent unit and a connectable child unit in each group.

FIG. 13C is a table showing an example of the parent unit connection information item stored on the memory 70 of a child unit. Set and stored in the parent unit connection information item 72 is information on one parent unit in the same group.

FIG. 13C shows the parent unit connection information 72 stored on the child unit C033 installed on the third floor and included in the group G3.

Set and stored here is information on one parent unit; that is, the parent unit P32 that belongs to the same group G3 that the child unit C033 belongs to.

After that, the user US1111 logs in the child unit C033 to input and select the print function. Hence, processing of distributing a job list information item is carried out as shown in FIG. 13D.

FIG. 13D is a diagram illustrating an example of how to process distribution of a job list information item between a connectable parent unit and a connectable child unit in each group.

As shown in FIG. 13D, for example, the user US1111 moves to the third floor. On the child unit C033 installed on the third floor, the user US1111 is authorized and logs in the child unit C033 to select and input the print function.

Upon receiving the input to select the print function, the child unit C033 reads out the parent unit connection information item 72 stored on the memory 70 of the child unit C033. The child unit C033 transmits a job list request including the user name (US1111) to a parent unit.

The child unit C033 stores the parent unit connection information item 72 for the child unit C033 shown in FIG. 13C. The child unit C033 transmits the job list request to one parent unit; that is, the parent unit P32 stored in the parent unit connection information item 72.

Here, the job list request is transmitted only to the parent unit P32 in the same group G3 as the group of the child unit C033 installed on the third floor where the user US1111 is found.

The parent unit P32 receives the job list request requesting the job list of the user US1111. After that, the parent unit P32 transmits a job list response to the child unit C033 installed on the same third floor and included in the group G3. The job list response includes the job list L1, of the user US1111, stored on the parent unit P32.

When receiving the job list L1, the child unit C033 causes the display 53 of the child unit C033 to display a job list display screen including the job list L.

The job list display screen displays the saved job name of the print data item included in the job list L1. Hence, the user US1111 at the child unit C033 can check the print data item that he or she has stored.

After that, on the child unit C033, for example, the user US1111 selects and inputs the saved job name of the print data item as a file to be printed out. The child unit C033 transmits a print information request to the parent unit storing the print data item. Then, the parent unit storing the print data item sends a print response information item back to the child unit C033. Because the print data per se is included in the print response information item, the child unit C033 can print out the print data item.

Thanks to the above processing, the job list information item, including the saved job name of the print data item, is distributed out of the group to a child unit that belongs to a different group from the group of the parent unit storing the print data item. Hence, even if the user does not know the group name of the parent unit storing the print data item or the group name of the child unit executing a print job, the above features make it possible to readily execute processing including saving and printing the print data item, and to increase convenience for the user.

Outline of a Method for Controlling Printing on the Printing Control System According to an Aspect of the Present Invention Described below is an outline of an example of a method for controlling printing carried out between a parent unit and a child unit included in the printing control system according to the present invention.

Parent Unit: Saving a Print Data Item

One or more print data items are saved on at least any given first parent unit among a plurality of parent units.

Parent Unit: Creating a Job List Information Item

The first parent unit saving a print data item creates a job list information item including a job name of the print data item.

Parent Unit: Distributing the Job List Information Item

The first parent unit distributes the created job list information item to parent units set in an other information item previously stored on the first parent unit.

Parent Unit: Receiving the Job List Information Item

The parent units set in the other parent unit information item receive and store the distributed job list information item.

Child Unit: Transmitting a Job List Request

Among a plurality of child units, any given first child unit transmits a job list request to one parent unit set in a parent unit connection information item previously stored on the first child unit. Here, the job list request requests the one parent unit to transmit, to the first child unit, a job list information item including the job name of the print data item.

Parent Unit: Obtaining the Job List Request

The parent unit set in the parent unit connection information item obtains the job list request.

Parent Unit: Transmitting a Job List Response

Obtaining the job list request, the parent unit transmits a job list response, including the job list information item, to the first child unit as a reply to the obtained job list request. The job list information item is stored on the parent unit, and includes the job name of the print data item requested by the job list request from the first child unit.

Child Unit: Obtaining the Job List Request

The first child unit obtains the job list response sent back from the parent unit to which the job list request has been transmitted.

Figure 15:
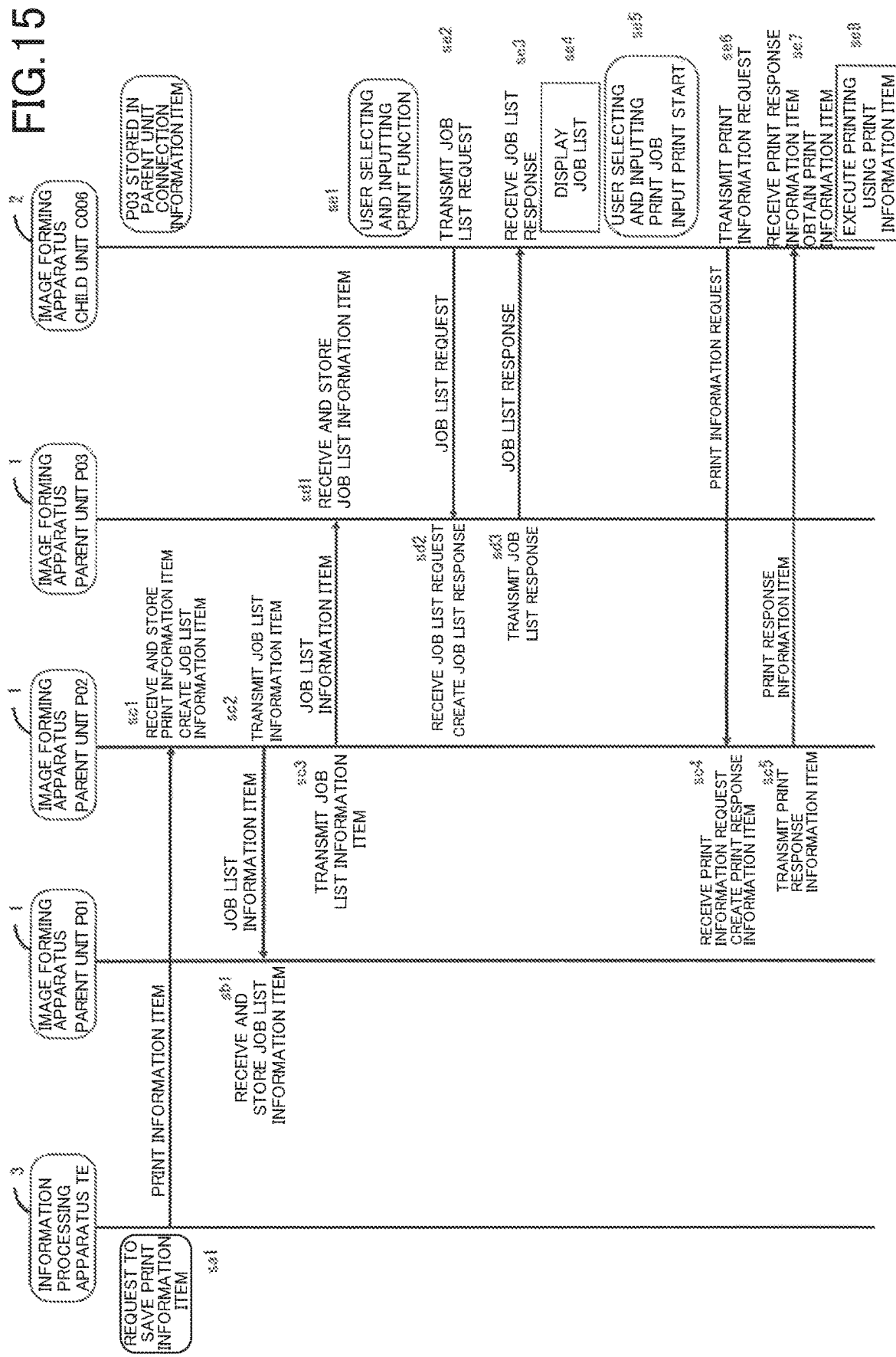
FIG. 15 is a diagram illustrating an example of an information communications sequence carried out by the printing control system according to the present invention.

Processing for Controlling Printing on the Printing Control System According to an Aspect of the Present Invention FIG. 15 is a diagram illustrating an example of an information communications sequence of processing for controlling printing carried out by the printing control system according to the present invention.

Described here is an information communications sequence in above Example 1 of how to process distribution of a job list information item.

The information communications sequence in FIG. 15 is performed among one information processing apparatus TE, three parent units (P01, P02, and P03), and one child unit C006.

Furthermore, the three parent units are not suspended, and capable of transmitting a job list response.

The parent unit P02 stores, as the other parent unit information item 32, identification information items for, and IP addresses of, two parent units (P01 and P03) illustrated in FIG. 5A.

The child unit C006 stores, as the parent unit connection information item 72, an identification information item for, and an IP address of, one parent unit P03 illustrated in FIG. 5B.

At Step sa1 in FIG. 15, the information processing apparatus TE sends a request to save a print information item.

In the request to save the print information item, for example, the user US1111 operates the information processing apparatus TE and inputs a request to save, on the parent unit P02, a print data item created by the user US1111.

Here, the user US1111 creates three print data items having respective job names F101, F102, and F103.

In this case, the information processing apparatus TE creates the print information item illustrated in FIG. 6 and including the user name US1111 and the job names F101, F102, and F103. The information processing apparatus TE transmits, to the parent unit P02, the print information item 33 including the three print data items per se having the job names F101, F102, and F103.

At Step sc1, the parent unit P02 receives the print information item 33 transmitted from the information processing apparatus TE, and stores the print information item 33 on the memory 30.

Hence, the parent unit P02 temporarily saves the three print data items per se having the job names F101, F102, and F103.

Receiving the print information item, the parent unit P02 creates a job list information item.

The parent unit 02 stores the three print data items created by the user US1111. Because the three print data items have the job names F101, F102, and F103, the job list information item includes the user name US1111, the saving parent unit name P02, and the saved job names F101, F102, and F103.

That is, this job list information item includes the saved job names of the print data items stored by the user US1111.

After that, the parent unit P02 transmits the created job list information item to other parent units.

Here, the parent unit P02 reads out the other parent unit information item 32 stored on the memory 30. The other parent unit information item 32 has information for two parent units (P01 and P03), and the parent unit P02 transmits the job list information item to these parent units (P01 and P03).

At Step sc2, the parent unit P02 transmits the job list information item to the parent unit P01. At Step sb1, the parent unit P01 receives the job list information item, and stores the job list information item on the memory 30 of the parent unit P01 itself.

At Step sc3, the parent unit P02 transmits the job list information item to the parent unit P03. At Step sd1, the parent unit P03 receives the job list information item, and stores the job list information item on the memory 30 of the parent unit P03 itself.

Hence, both of the parent units P01 and P03 store the job list information item for the print data items stored by the user US1111.

Next, at Step se1 in FIG. 15, a user selects and inputs a print function on a child unit connectable to a parent unit.

Here, for example, the same user US1111 moves to the child unit C006, and uses the console of the child unit C006 for authentication and log-in of himself or herself. After that, the user US1111 causes the child unit C006 to display a function selection screen that allows the user US1111 to select a function of his or her choice, and selects and enters a print function.

At Step se2, the child unit C006 transmits a job list request to a parent unit, in order to obtain information to be printed out.

The child unit C006 stores an identification information item for one parent unit P03 as the parent unit connection information item 72. The child unit C006 transmits the job list request to the parent unit P03.

This job list request includes, for example, the child unit name C006, the destination parent name P03, and the user name US1111.

At Step sd2, the parent unit P03 receives the job list request.

Receiving the job list request, the parent units P03 checks whether the memory 30 of the parent unit P03 itself stores the job list information item for the print data items stored by the user US1111. If the job list information item is stored, the parent unit P03 creates a job list response, using this job list information item.

The parent unit P03 stores the job list information item for the print data items stored at above Step sd1 by the user US1111. Hence, the parent unit P03 creates the job list response including the user name US1111, the saving parent unit name P02, and the saved job names F101, F102, and F103.

At Step sd3, the parent unit P03 transmits the created job list response to the child unit C006 that has transmitted the job list request.

At Step se3, the child unit C006 receives the job list response.

The child unit C006 checks the detail of the job list response received from the parent unit P03, and obtains the saving parent unit name P02 and saved job names F101, F102, and F103 included in the job list response. Hence, the child unit C006 determines that the parent unit P02 stores the three print data items having the saved job names F101, F102, and F103.

At Step se4, the display 53 of the child unit C006 displays the obtained job list.

For example, the display 53 of the child unit C006 displays a job list display screen in FIG. 14.

At Step se5, the user US1111 watches the job list display screen displayed on the display of the child unit C006 to check the print data items that he or she has stored on the parent unit P02, and selects and inputs a print job name of a print data item that he or she would like to print out.

For example, on the job display screen in FIG. 14, the user US1111 checks a selection box for the print job name of a print data item of his or her choice.

FIG. 14 shows that the user US1111 checks selection boxes corresponding to two print job names (F101 and F103).

After that, the user US1111 selects and input "PRINTING START" on the job display screen in FIG. 14.

At Step se6, the child unit C006 transmits the print information request 76 to the parent unit P02; that is, the saving parent unit name included in the job list response. As the first print information request in FIG. 9 shows, the print information request 76 includes the print job names (F101 and F103) selected and input as request job names.

At Step sc4, the parent unit P02 receives the print information request. The parent unit P02 reads, from the memory 30, print data items having print job names included in the print information request, and creates the print response information item 38.

For example, as shown in FIG. 10, the print response information item 38 includes: the print job names (F101 and F103) as print request job names; and the print data items perse having these print job names.

At Step sc5, the parent unit P02 transmits the created print response information item 38 to the child unit C006.

Moreover, after transmitting the print response information item 38, the parent unit P02 may delete, from the memory 30, the print data items per se whose print job names (F101 and F103) are included in the print information request.

Alternatively, after the child unit C006 prints out the print data items, and the parent unit P02 receives a print end notice from the child unit C006, the parent unit P02 may delete the print data items from the memory 30.

At Step se7, the child unit C006 receives the transmitted print response information item 38, and obtains the print information item 78 included in the print response information item 38.

At Step se8, the child unit C006 obtains the print data items whose print job names (F101 and F103) are included in the obtained print information item 78. A print output unit of the child unit C006 prints out the print data items on predetermined printing paper.

Hence, the information communications sequence in processing for controlling printing ends, and the print data items stored by the user on a parent unit are printed out from a child unit different from the parent unit.

Note that, in the information communications sequence, the child unit C006 prints out the print data items. The image forming apparatus that actually prints out the print date items may be either a parent unit storing the print data items other than a child unit, or an other parent unit than the parent unit storing the print data items.

In the information communications sequence in FIG. 15, the job list request is transmitted to one parent unit alone. Compared with a case where the job list request is transmitted to the parent units, such a feature makes it possible to reduce an amount of communications traffic and decrease the load on the parent units and the child units.

Figure 16:
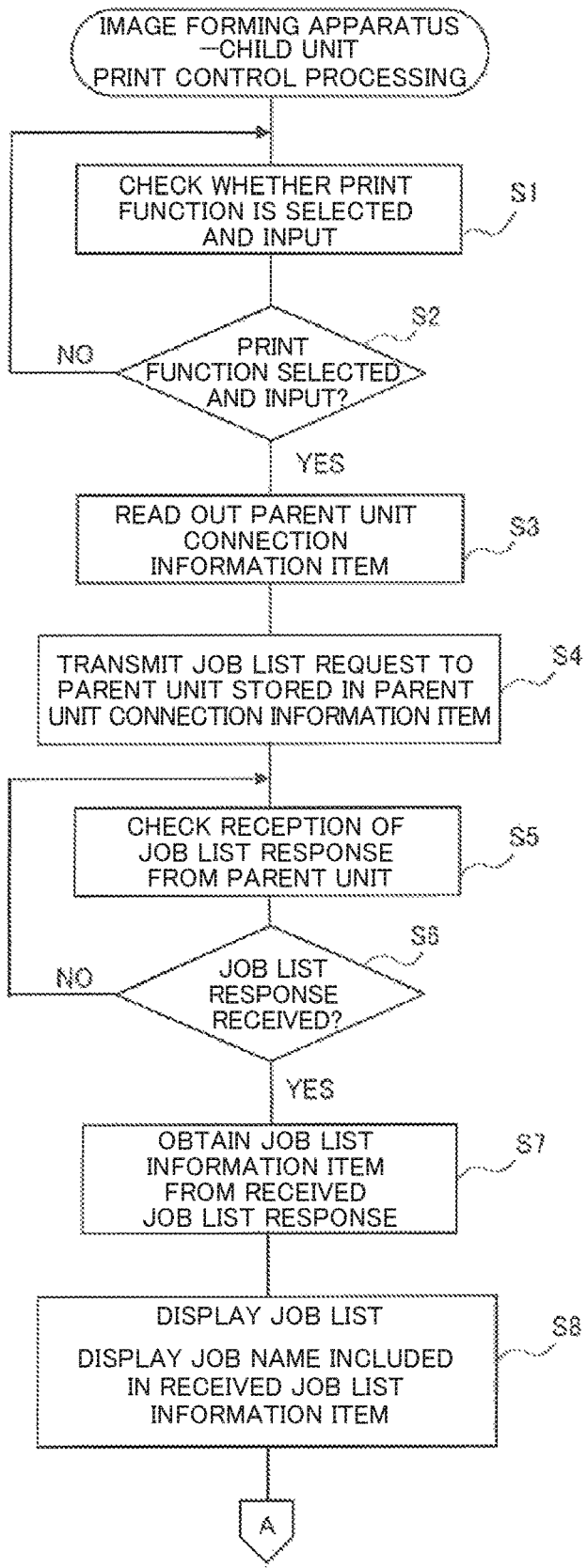
FIG. 16 is a flowchart showing an example of print control processing executed by a child unit among the image forming apparatuses according to the present invention.
Figure 17:
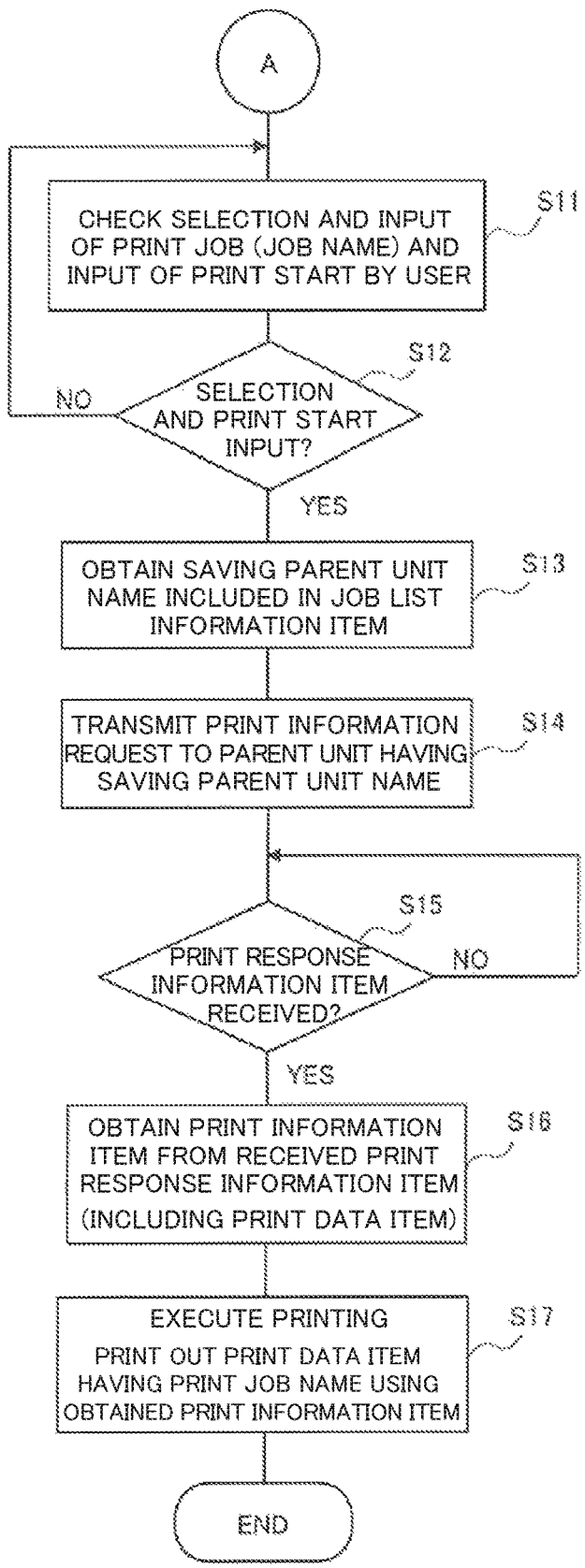
FIG. 17 is a flowchart showing an example of print control processing executed by a child unit among the image forming apparatuses according to the present invention.

Examples of Print Control Processing Executed by a Child Unit According to an Aspect of the Present Invention FIGS. 16 and 17 are flowcharts showing an example of print control processing executed by the child unit among the image forming apparatuses.

Described here are flowcharts of a series of print control processing executed by a child unit in the information communications sequence in FIG. 15.

As a precondition, as seen in the information communications sequence in FIG. 15, the user operates the information processing apparatus TE to input an instruction to cause a predetermined parent unit to store a print data item of the user (a request operation to save a print information item). The print data item is transmitted to, and saved temporarily on, the parent unit.

At Step S1 in FIG. 16, the child unit checks whether a print function is selected and input.

Using the information processing apparatus TE, the user carries out the request operation to save the print information item. After that, the user moves to a child unit of his or her choice. In order to execute the print function to print out his or her print data item stored on the predetermined parent unit, the user operates the child unit and inputs a selection of the print function. Here, the child unit stores a user name of the user operating the child unit or an identification information item on the user.

Note that the child unit may authenticate the user before the above input operation, in order to check whether the user is authorized to use the child unit.

At Step S2, if the user selects and inputs the print function, the processing proceeds to Step S3. If not, the processing returns back to Step S1.

At Step S3, the child unit reads out the parent unit connection information item 72 stored on the memory 70 of the child unit.

At Step S4, the child unit transmits the job list request to a connectable parent unit stored in the read parent unit connection information item 72.

At Step S5, the child unit checks reception of a job list response; that is, a reply from the parent unit.

At Step S6, if the child unit has received the job list response, the processing proceeds to Step S7. If not, the processing returns back to Step S5.

An example of the job list response is information shown in FIG. 8B.

At Step S7, the child unit obtains a job list information item from the received job list response.

At Step S8, the child unit displays a job list.

That is, the display 53 displays "SAVED JOB NAME" included in the received job list information item.

For example, the display 53 displays a job list display screen in FIG. 14.

In order to carry out printing, the user may watch the job list display screen to select a file to be printed out from files displayed under "SAVED JOB NAME", and to input "PRINT START".

After that, the processing proceeds to Step S11 in FIG. 17.

At Step S11 in FIG. 17, the user checks "SAVED JOB NAME" displayed on the job list display screen to see whether a print job (a job name) to be printed out is selected and input, and print start is input.

At Step S12, if the user inputs a selection and print start, the processing proceeds to Step S13. If not, the processing returns back to Step S11.

At Step S13, the child unit obtains a saving parent unit name included in the job list information item.

The parent unit having the saving parent unit name stores the print data item.

At Step S14, the child unit transmits a print information request to the parent unit having the saving parent unit name.

Here, the child unit transmits, to the parent unit having the saving parent unit name, the print information request including a "REQUEST FILE" indicating the user name and the job name of the print data item.

For example, the child unit transmits the first print information request in FIG. 9.

The parent unit receiving the print information request reads out the user name included in the print information request and the print data item identified with the request file. The parent unit then creates a print response information item including the read out print data item per se, and transmits the created print response information item to the child unit that has transmitted the print information request.

For example, the child unit transmits the print response information item in FIG. 10.

At Step S15, the child unit checks whether the child unit has received the print response information item. If so, the processing proceeds to Step S16. If not, the processing repeats Step S15. Alternatively, if the child unit does not have the print response information item after a predetermined time has passed, the processing may return back to Step S14 and the child unit may retransmit the print information request.

At Step S16, the child unit checks the detail of the received print response information item, and obtains a print information item. The print information item includes the print data item per se.

At Step S17, using the obtained print information item, the child unit prints out, on predetermined printing paper, the print data item whose print job name is included in the print information item.

Hence, the child unit finishes the print control processing, and the print data item stored by the user on the parent unit is printed out from a child unit different from the parent unit.

Note that the user can print out the print data item also with the parent unit. If the user uses a parent unit of his or her choice for printing, the parent unit executes the same print control processing as that executed by the above child unit.

Figure 18:
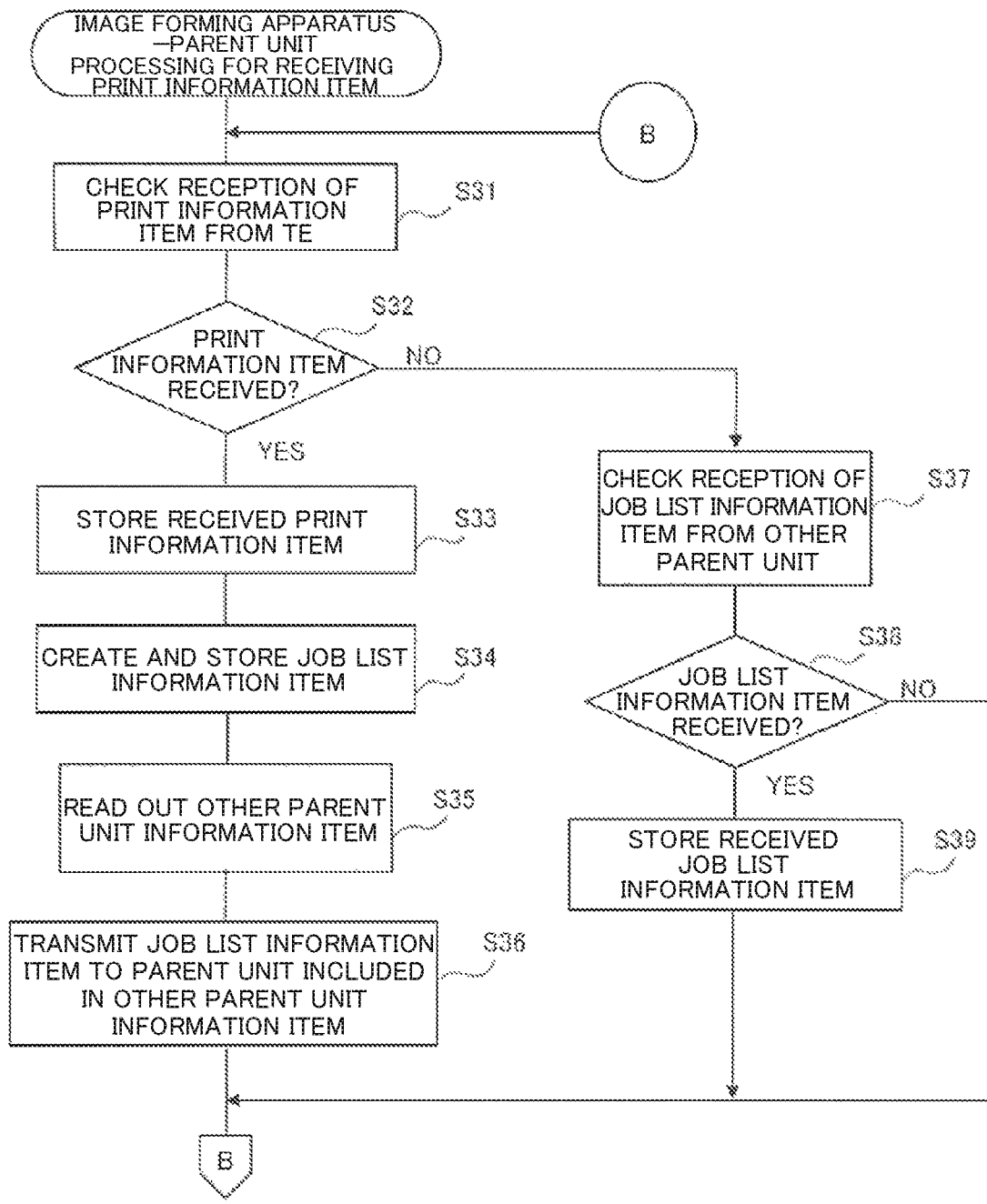
FIG. 18 is a flowchart showing an example of processing for receiving a print information item and distributing a job list information item executed by a parent unit among the image forming apparatuses according to the present invention.
Figure 19:
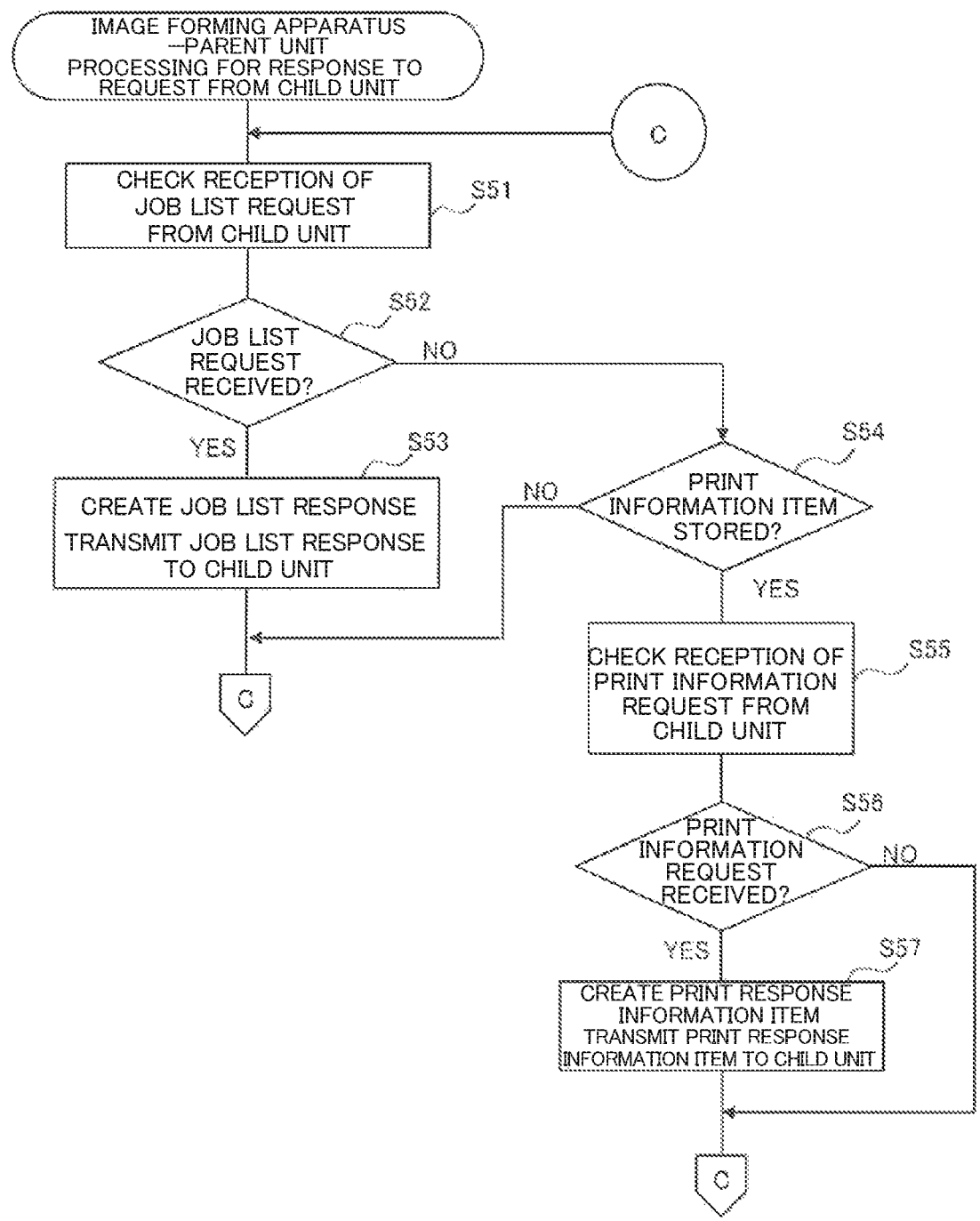
FIG. 19 is a flowchart showing an example of response processing (transmission of a job list response and a print response information item) executed by a parent unit in response to a request from a child unit among the image forming apparatuses according to the present invention.

Other Embodiments of Print Control Processing Executed by a Parent Unit According to an Aspect of the Present Invention FIGS. 18 and 19 are flowcharts showing an example of print control processing executed by a parent unit among the image forming apparatuses.

FIG. 18 is a flowchart showing an example of processing for receiving a print information item and distributing a job list information item.

FIG. 19 is a flowchart showing an example of processing for responding to a request from a child unit (transmitting a job list response and a print response information item).

Processing for Receiving a Print Information Item and Distributing a Job List Information Item At Step S31 in FIG. 18, a parent unit receives a print information saving request from the information processing apparatus TE to check whether the parent unit has received a print information item.

At Step S32, if the parent unit has received the print information item, the processing proceeds to Step S33. If not, the processing proceeds to Step S37.

At Step S33, the parent unit stores the received print information item.

Hence, a print data item created by the user is temporarily stored on the memory 30 of the parent unit.

At Step S34, the parent unit creates, and stores thereon, a job list information item. Here, as illustrated in FIG. 8A, the created job list information item includes a user name, a saving parent unit name, and a saved job name.

At Step S35, the parent unit reads out an other parent unit information item stored on the memory 30.

At Step S36, the parent unit transmits the job list information item to other parent units included in the other parent unit information item. The processing returns back to Step S31.

At Step S37, the parent unit checks whether the parent unit has received a job list information item from an other parent unit.

At Step 38, if the parent unit has received the job list information item, the processing proceeds to Step S39. If not, the processing returns back to Step S31.

At Step S39, the parent unit stores the received job list information item. The processing returns back to Step S31.

In the above processing, a parent unit receives a print data item transmitted from the TE. The parent unit transmits, to the other parent units included in the other parent unit information item, a job list information item including a user name, a saving parent unit name, and a saved job name. Hence, the job list information item including a job name of the print data item is stored not only on the parent unit storing the print data item, but also on the parent units not storing the print data item.

Processing for a Response to a Request from a Child Unit

At Step S51 in FIG. 19, a parent unit checks whether the parent unit has received a job list request from a child unit.

At Step 52, if the parent unit has received the job list request, the processing proceeds to Step S53. If not, the processing returns back to Step S54.

At Step S53, the parent unit creates a job list response, and transmits the created job list response to the child unit that has transmitted the job list request.

The job list response includes a user name, a saving parent unit name, and a saved job name. After that, the processing returns back to Step S51.

At Step S54, the parent unit checks whether the memory 30 stores a print information item. If the memory 30 stores at least one print information item, the processing proceeds to Step S55. If not, the processing returns back to Step S51.

At Step S55, the parent unit checks whether the parent unit has received a print information request from the child unit.

At Step S56, if the parent unit has received the print information request, the processing proceeds to Step S57. If not, the processing returns back to Step S51.

At Step S57, the parent unit creates a print response information item in response to the print information request, and transmits the created print response information item to the child unit that has transmitted the print information request.

The memory 30 should store the print data item requested by the print information request. The parent unit reads out the print data item and creates the print response information item.

The print response information item includes the user name, a print job name, and the print data item per se.

After that, the processing returns back to Step S51.

In the above processing, in response to a job list request transmitted from a child unit, a parent unit transmits a job list response including a user name, a saving parent unit name, and a saved job name. In response to a print information request transmitted from the child unit, the parent unit transmits a print response information item including the user name, a print job name, and a print data item per se.

The printing control system according to the above embodiments creates the fewest job list requests possible to be transmitted from a child unit to reduce the amount of communications traffic and to decrease the load on the parent units and the child units. While there have been described what are at present considered to be certain embodiments of the invention, it will be understood that various modifications may be made thereto, and it is intended that the appended claims cover all such modifications as fall within the true spirit and scope of the invention.

What is claimed is:

1. A printing control system, comprising:
    parent units comprising a first plurality of image forming apparatuses and parent unit controllers; and child units comprising a second plurality of image forming apparatuses and child unit controllers, wherein
    the first and the second pluralities of image forming apparatuses are connected to each other through a network, at least one of the parent units is a connectable parent unit, the connectable parent unit is identifiable by a parent unit connection information item stored in the connectable parent unit,
    the parent unit controllers control each of the parent units to:
        store a job list information item comprising job names of at least one print data item, and obtain the job list information item from another parent unit of the parent units; and
        obtain a job list request requesting for transmission of the job list information item from a child unit of the child units, and transmit a job list response including the requested job list information item to the child unit of the child units,
    the child unit controllers control each of the child units to:
        transmit the job list request to the connectable parent unit; and
        obtain the job list response from the parent unit, the parent unit either storing the print data item to be identified with the job name of the print data item included in the job list information item requested by the job list request, or the parent unit not storing the print data item,
    the parent unit controllers further control each of the parent units to:
        save the at least one print data items in a first memory;
        transmit a job list information item to another parent unit, the job list information item including the job names of the at least one print data item saved on the first memory; and
        obtain the job list request transmitted from the child unit, the job list request requesting for transmission of the job list information item to the child unit, the job list information item including the job name of the at least one print data items, and
    store, on the first memory, the job list information item transmitted from another parent unit, and
    the child unit controllers further control each of the child units to store the parent unit connection information item that identifies the connectable parent unit in a second memory.

2. The printing control system according to claim 1, wherein
    the first memory of the parent unit stores a parent unit information item of another parent unit, the parent unit information including information of other connectable parent units of the parent units, and
    the parent unit controllers further control a parent unit of the parent units to transmit the job list information item to the other one or more connectable parent units stored in another parent unit information item.

3. The printing control system according to claim 1, wherein
    the parent unit connection information item, stored on the second memory of each of the child units, comprises information of one of the parent units.

4. The printing control system according to claim 1, wherein
    a plurality of the parent units and a plurality of the child units are connectable parent units and connectable child units, respectively, the image forming apparatuses of the connectable parent units and the image forming apparatuses of the connectable child units are set as one group,
    the parent unit connection information item further identifies the parent units and the child units which belong to a same group, and
    the child unit controllers further control the child unit to transmit the job list request to the parent units which are identifiable by the parent unit connection information items.

5. The printing control system according to claim 1, wherein
    each of the child units further includes a job list display unit that causes the job list information item, included in the job list response obtained by the child unit controllers, to be displayed.

6. The printing control system according to claim 5, wherein
the child controllers further controller each of the first child units to:
when the job name of the at least one print data items to be printed out with a child unit of the child units is selected from the job list information item displayed by the job list display unit, transmit a print information request to the parent unit that stores the at least one print data items which has the selected job name, wherein the print information request includes the selected job name of the at least one print data items and a request of transmitting the at least one print data items having the selected job names to the child unit; and
obtain a print response information item as a reply to the print information request,
the parent unit controllers further control each of the parent units to:
transmit the print response information item to each of the child units that has transmitted the print information request, wherein the print response information item is identified by the selected job name and by the at least one print data items stored on the first memory, and
when the child unit transmits the print information request to the parent unit that stores the at least one print data items which has the selected job name, and the parent unit sends the print response information item back to the child unit, the child unit prints out the print data item included in the print response information item obtained by the print information obtaining circuitry.

7. The printing control system according to claim 1, wherein
in response to a request that a parent unit of the parent units transmits, to the a child unit of the child units, the job list information item comprising the job name of the at least one print data items stored in one of the parent units of a specific user,
the child unit controllers further control the child unit to transmit the job list request to the parent unit identified by the parent unit connection information item, the job list request including an identification information item of the specific user, and
when the parent unit obtains the job list request, the parent unit controllers further control the parent unit to: obtain the job list information item that is stored on the first memory, the job list information item comprising the job name of the at least one print data items stored by the specific user identified with the identification information item included in the job list request; and transmit the job list response, including the obtained job list information item, to the child unit that has transmitted the job list request.

8. The printing control system according to claim 1, wherein
the parent units and the child units are separated into a plurality of groups, at least one of the parent units is connectable, at least one of the child units is connectable, and the first plurality of image forming apparatuses of the connectable parent units and the second plurality of image forming apparatuses of the connectable child units belong to a group of the plurality of groups,
the parent unit connection information item, stored on the second memory of the child unit, comprises information of a parent unit of the parent units that belongs to a same group that the child unit belongs to; and information of each parent unit of the parent units that belongs to the respective groups to which the child unit does not belong,
the parent unit controllers further control the parent unit storing the at least one print data items to transmit the job list information item to at least one other parent unit that belongs to a same group that the parent unit belongs to, the job list information item comprising the job name of the at least one print data items stored on the first memory of the parent unit,
if the at least one other parent units belongs to a group where the job list information item is obtained, the child unit controllers further control the child unit to transmit the job list request to the parent units stored in the parent unit connection information item, and
when a parent unit of the parent units receives the job list request and obtains the job list information item requested by the child unit, the parent unit controllers further control the parent unit to transmit the job list response to the child unit as a reply to the obtained job list request, the job list response comprising the job list information item requested by the child unit.

9. The printing control system according to claim 1, wherein
the parent units and the child units are separated into a plurality of groups, at least one of the parent units is connectable, at least one of the child units is connectable, and the first plurality of image forming apparatuses of the connectable parent units and the second plurality of image forming apparatuses of the connectable child units belong to a group of the plurality of groups,
the first memory of each of the parent units further saves parent unit information items of other parent units, the parent unit information items including: information of at least one other parent units that belongs to a same group that the parent unit belongs to; and information of each of the parent units that belongs to the respective groups to which the parent unit does not belong to,
the parent unit controllers further control a first parent unit of the parent units, the first parent unit storing the at least one print data item on the first memory, to transmit the job list information item to the other parent units which are identified by the parent unit information saved in the first parent unit, the job list information item including the job name of the at least one print data items stored on the first memory,
after a second parent unit of the parent units obtains the job list information item transmitted from the first parent unit, the second parent unit transmits the obtained job list information item to the other parent unit that is identified by the parent unit information saved in the second parent unit, and that belongs to a same group that the second parent unit belongs to, and the other parent unit receiving the job list information item from the second parent unit stores the job list information item on the first memory of the other parent unit,
the child unit controllers further control the child unit to transmit the job list request to the parent unit stored in the parent unit connection information item saved in the child unit, and
the parent unit controllers further control the parent unit that obtained the job list request, to transmit the job list response to the child unit as a reply to the obtained job list request, the job list response including the job list information item which is stored on the first memory of the parent unit and requested by the child unit.

10. A printing control system, comprising:
parent units comprising a first plurality of image forming apparatuses; and child units comprising a second plurality of image forming apparatuses, the first and the second pluralities of image forming apparatuses are connected to each other through a network,
each of the parent units including:
a first memory that stores at least one print data items; and
a parent unit controller that causes the parent unit:
transmit a job list information item to another parent unit included in the parent units, the job list information item including job names of the at least one print data items stored on the first memory;
obtain the job list information item transmitted from the other parent unit, and store the job list information item on the first memory;
obtain a job list request transmitted from a first child unit included in the child units, and transmit the job list information item to the child unit, the job list information item including the job names of the at least one print data items; and
transmit a job list response to the first child unit as a response to the obtained job list request, the job list response including the job list information item requested from the first child unit, and
each of the child units including:
a second memory that stores a parent unit connection information item that identifies a connectable parent unit included in the parent units; and
a child unit controller that causes the child unit:
transmit the job list request to the connectable parent unit, the connectable parent unit identified by a parent unit connection information item stored in the connectable parent unit; and
obtain the job list response to be sent back from the parent unit to which the job list request has been transmitted, wherein
the first child unit obtains the job list response from a parent unit of the parent units either storing the at least one print data items to be identified with the job name of the at least one print data items included in the job list information item requested by the job list request, or not storing the at least one print data items.

11. The printing control system according to claim 10, wherein
the first memory of the parent unit stores a parent unit information item of another parent unit, the parent unit information including information of other connectable parent units of the parent units, and
the parent unit controller further causes the parent unit to transmit the job list information item to the other one or more connectable parent units stored in another parent unit information item.

12. The printing control system according to claim 10, wherein
a plurality of the parent units and a plurality of the child units are connectable parent units and connectable child units, respectively, the image forming apparatuses of the connectable parent units and the image forming apparatuses of the connectable child units are set as one group,
the parent unit connection information item further identifies the parent units and the child units which belong to a same group, and
the child unit controller further causes the child unit to transmit the job list request to any of the parent units which are identifiable by the parent unit connection information items.

13. The printing control system according to claim 10, wherein
each of the child units further includes a job list display unit that causes the job list information item, included in the job list response obtained by the job list response obtaining circuitry, to be displayed.

14. The printing control system according to claim 13, wherein
the child unit controller of each of the first child units further causes the child unit to:
when the job name of the at least one print data items to be printed out with one of first child units is selected from the job list information item displayed by the job list display unit, transmit a print information request to the parent unit that stores the at least one print data items which has the selected job name, wherein the print information request includes the selected job name of the at least one print data items and a request of transmitting of the at least one print data items having the selected job names to the first child unit; and
obtain a print response information item as a reply to the print information request,
the parent unit controller further causes the parent units to:
transmit the print response information item to each of the child units that has transmitted the print information request, wherein the print response information item is identified by the selected job name and by the at least one print data items stored on the first memory, and
when the first child unit transmits the print information request to the parent unit that stores the at least one print data items which has the selected job name, and the parent unit sends the print response information item back to the child unit, the child unit controller causes the child unit to print out the print data item included in the print response information item obtained by the parent unit.

15. The printing control system according to claim 10, wherein
in response to a request that a parent unit of the parent units transmits, to the a first child unit of the child units, the job list information item comprising the job name of the at least one print data items stored in the parent unit of a specific user,
the child unit controller further causes the first child unit to transmit the job list request to the parent unit identified by the parent unit connection information item, the job list request including an identification information item of the specific user, and
when the parent unit obtains the job list request, the parent unit controller further causes the parent unit to:
obtain, from among the job list information item that is stored on the first memory, the job list information comprising the job name of the at least one print data items stored by the specific user identified with the identification information item included in the job list request; and
transmit the job list response, including the obtained job list information item, to the child unit that has transmitted the job list request.

16. The printing control system according to claim 10, wherein the parent units and the child units are separated into a plurality of groups, at least one of the parent units is connectable, at least one of the child units is connectable, the first plurality of image forming apparatuses of the connectable parent units and the second plurality of image forming apparatuses of the connectable child unit belong to a group of the plurality of groups, the parent unit connection information item, stored on the second memory of child unit, comprises information of a parent unit of the parent units that belongs to a same group that the child unit belongs to; and information of each parent unit of the parent units that belongs to the respective groups to which the child unit does not belong, the parent unit controller further cause the parent unit storing the at least one print data items to transmit the job list information item to at least one other parent units that belongs to a same group that the parent unit belongs to, the job list information item comprising the job name of the at least one print data items stored on the first memory of the parent unit, if the at least one other the parent unit belongs to a group where the job list information item is obtained, the child unit controller of the first child unit further cause the first child to transmit the job list request to the parent units stored in the parent unit connection information item, and when a parent unit of the parent units receives the job list request and obtains the job list information item requested by the first child unit, the parent unit controller further cause the parent unit to transmit the job list response to the first child unit as a reply to the obtained job list request, the job list response comprising the job list information item requested by the child unit.

17. The printing control system according to claim 10, wherein the parent units and the child units are separated into a plurality of groups, at least one of the parent units is connectable, at least one of the child units is connectable, the first plurality of image forming apparatuses of the connectable parent units and the second plurality of image forming apparatuses of the connectable child units belong to a group of the plurality of groups;

the first memory of each of the parent units further stores parent unit information items of other parent units, the parent unit information items including: information of at least one other parent units that belongs to a same group that the parent unit belongs to; and information of each of the parent units that belongs to the respective groups to which the parent unit does not belong to, the parent unit controller of a first parent unit of the parent units further causes the first parent unit, the first parent unit storing the at least one print data item on the first memory, to transmit the job list information item to the other parent units which are identified by the parent unit information saved in the first the parent unit, the job list information item including the job name of the at least one print data items stored on the first memory, after a second parent unit of the parent units obtains the job list information item transmitted from the first parent unit, the parent unit controller of the second parent unit causes the second parent unit to transmit the obtained job list information item to the other parent unit that is identified by the parent unit information saved in the second parent unit, and that belongs to a same group that the second parent unit belong to, and the other parent unit receiving the job list information item from the second parent unit stores the job list information item on the first memory of the other parent unit, the child unit controller of the first child unit further causes the first child unit to transmit the job list request to the parent unit stored in the parent unit connection information item saved in the first child unit, and the parent unit controller of the parent unit obtaining the job list request, further causes the parent unit to transmit the job list response to the first child unit as a reply to the obtained job list request, the job list response including the job list information item which is stored on the first memory of the parent unit and requested by the first child unit.

18. A method for controlling printing performed by a printing control system including a first plurality of image forming apparatuses set as parent units and a second plurality of image forming apparatuses set as child units, the first and the second plurality of image forming apparatuses are connected to each other through a network, the method comprising:

saving at least one print data items on at least one parent unit of the parent units;

creating a job list information item including a job name of the at least one print data items, the job list information item being created by a corresponding parent unit of the parent units that saves the one or more print data items;

distributing the job list information item to other parent unit of the parent units, the other parent unit being identified by an parent information item stored on the corresponding parent unit;

receiving the job list information item by, and storing the job list information item on, the other parent unit identified by the parent unit information item;

requesting for transmission of a job list request from a child unit of the child units to a parent unit of the parent units, wherein the job list request comprises a request for transmission of the job list information item and the job name of the at least one print data items, to the child unit, and to a corresponding parent unit identified by a parent unit connection information item stored on the first child unit;

obtaining the job list request by the corresponding parent unit identified by the parent unit connection information item;

transmitting a job list response, by the corresponding parent unit that obtains the job list request, to the first child unit as a reply to the obtained job list request, wherein the job list response comprises the job list information item stored on the corresponding parent unit and the job name of the at least one print data item requested by the job list request from the child unit; and obtaining, by the child unit, the job list response from the corresponding parent unit that transmits the job list request.

19. A method for controlling printing performed by a printing control system including a first plurality of image forming apparatuses set as parent units and a second plurality of image forming apparatuses set as child units, the first and the second plurality of image forming apparatuses are connected to each other through a network, the method comprising:

obtaining, by a parent unit of the parent units, a job list information item from another parent unit of the parent units, and storing the job list information item on the parent unit, the job list information item including a job name of a print data item stored on the other parent unit;

requesting, by a child unit of the child units, for transmission of a job list request to a connectable parent unit of the parent units, the connectable parent unit being identified by a parent unit connection information item stored in the child unit, the job list request requesting for transmission of the job list information item;

obtaining, by the connectable parent unit, the job list request transmitted from the child unit and transmitting, by the connectable parent unit, a job list response to the child unit;

obtaining, by the child unit, the job list response from either one of: the other parent unit storing the print data item identified by the job name of the print data item included in the job list information item requested by the job list request, or a parent unit included in the parent units and not storing the print data item;

saving at least one of the print data items in a first memory of each of the parent units;

transmitting a job list information item to the other parent unit, the job list information item including the job name of the at least one print data items saved on the first memory;

obtaining the job list request transmitted from the child unit and requesting for transmission of the job list information item to the child unit, the job list information item including the job name of the at least one print data items;

storing, on the first memory of the parent unit, the job list information item transmitted from the other parent unit; and storing the parent unit connection information item that identifies the connectable parent unit, in a second memory of each of the child units.

* * * * *